(12) United States Patent
Zakharchenko

(10) Patent No.: US 12,298,888 B2
(45) Date of Patent: May 13, 2025

(54) APPLICATION SCENARIO INJECTION AND VALIDATION SYSTEM

(71) Applicant: THE BANK OF NEW YORK MELLON, New York, NY (US)

(72) Inventor: Aleksandr Zakharchenko, Union, NJ (US)

(73) Assignee: THE BANK OF NEW YORK MELLON, New York, NY (US)

(*) Notice: Subject to any disclaimer, the term of this patent is extended or adjusted under 35 U.S.C. 154(b) by 154 days.

(21) Appl. No.: 17/961,905

(22) Filed: Oct. 7, 2022

(65) Prior Publication Data

US 2024/0118991 A1    Apr. 11, 2024

(51) Int. Cl.
  *G06F 11/362* (2025.01)
  *G06F 11/3604* (2025.01)
(52) U.S. Cl.
  CPC ...... *G06F 11/3644* (2013.01); *G06F 11/3608* (2013.01)
(58) Field of Classification Search
  CPC ............................................. G06F 11/36
  See application file for complete search history.

(56) References Cited

U.S. PATENT DOCUMENTS

| | | | |
|---|---|---|---|
| 7,519,960 B2 * | 4/2009 | Mei | G06F 11/3664 717/124 |
| 10,878,515 B2 | 12/2020 | Palombo et al. | |
| 10,891,463 B2 | 1/2021 | Osiecki | |
| 11,063,840 B1 | 7/2021 | Li et al. | |
| 2005/0182750 A1 * | 8/2005 | Krishna | G06F 11/3438 714/E11.2 |

(Continued)

FOREIGN PATENT DOCUMENTS

| | | | | |
|---|---|---|---|---|
| CN | 111459824 A | | 7/2020 | |
| CN | 111797015 A | * | 10/2020 | ......... G06F 11/3688 |

OTHER PUBLICATIONS

EunJin Jeong et al., "FIFA: A Kernel-Level Fault Injection Framework for ARM-based Embedded Linux System", [Online], [Retrieved from Internet Apr. 24, 2024], <https://ieeexplore.ieee.org/stamp/stamp.jsp?tp=&arnumber=7927960> (Year: 2017).*

(Continued)

*Primary Examiner* — Ziaul A Chowdhury
(74) *Attorney, Agent, or Firm* — Pillsbury Winthrop Shaw Pittman, LLP

(57) ABSTRACT

Provided is a method including identifying one or more injection points in a flow of an application and determining that a first injection point of the one or more injection points permits scenario injection. The method further includes injecting first scenario source code for a first scenario function at the first injection point in source code of the application and storing the application including the first scenario source code for the first scenario function. The method further includes receiving instruction to activate the first scenario function, activating the first scenario function. Furthermore, the method includes running the application when the first scenario function is activated, such that the running the application when the first scenario function is activated causes the application to operate concurrently with the first scenario function and providing a first application output.

20 Claims, 31 Drawing Sheets

(56) References Cited

U.S. PATENT DOCUMENTS

| | | | | |
|---|---|---|---|---|
| 2014/0195857 | A1* | 7/2014 | Song | G06F 11/3668 |
| | | | | 714/38.1 |
| 2015/0161025 | A1 | 6/2015 | Baset et al. | |
| 2015/0212923 | A1 | 7/2015 | Sugiyama et al. | |
| 2017/0147317 | A1 | 5/2017 | Shifman et al. | |
| 2018/0285239 | A1* | 10/2018 | Papak | G06F 11/3644 |
| 2021/0357310 | A1* | 11/2021 | Blouvshtein | G06F 11/302 |
| 2025/0053501 | A1* | 2/2025 | Ayyadurai | G06F 11/3684 |

OTHER PUBLICATIONS

NPL_CN111797015A_English Translation (Year: 2020).*

Ariel Tseitlin, "The Antifragile Organization", Communications of the ACM, Aug. 2013, 56(8), pp. 40-44.

Ali Basiri et al., "Chaos Engineering", IEEE Software, May-Jun. 2016, IEEE Software, 33(3), pp. 35-41.

I. Cosmina et al. "Chapter 4—Spring Configuration in Detail and Spring Boot", (2017), Introducing Spring AOP. In Pro Spring 5 (pp. 211-295). Apress, Berkeley, CA.

P.W.L. Bollen et al., "BPMN: A Meta Model for the Happy Path", Maastricht University School of Business and Economics, Meteor Research Memorandum No. 003, Jan. 1, 2010, 30 pgs. https://doi.org/10.26481/umamet.2010003.

Michael Dumiak, "Chaos Engineering Saved Your Netflix, Extreme Stress Testing of Online Platforms has Become It's Own Science", IEEE Spectrum, vol. 58, No. 3, pp. 4-10, Mar. 2021.

Ulf Gunneflo et al., "Evaluation of Error Detection Schemes Using Fault Injection by Heavy-ion Radiation", 1989 The Nineteenth International Symposium on Fault-Tolerant Computing, Digest of Papers, IEEE Computer Society, Jan. 1989, pp. 340-347.

Victor Heorhiadi et al., "Gremlin: Systematic Resilience Testing of Microservices", IEEE 36th International Conference on Distributed Computing Systems (ICDCS), Jun. 2016, pp. 57-66.

Jeffrey C. Mogul et al., "Nines are Not Enough: Meaningful Metrics for Clouds", HotOS '19, May 13-15, 2019, Bertinoro, Italy, Proceedings of the Workshop on Hot Topics in Operating Systems, pp. 136-141.

Henrique Madeira et al., "RIFLE: A general purpose pin-level fault injector", European Dependable Computing Conference, Springer, Berlin, Heidelberg, Oct. 1994 pp. 197-216.

Long Zhang et al., "A Chaos Engineering System for Live Analysis and Falsification of Exception-Handling in the JVM", IEEE Transactions on Software Engineering, (2019) 47(11) pp. 2534-2548.

International Search Report & Written Opinion of the International Searching Authority dated Jan. 30, 2024, issued in corresponding International Application No. PCT/US2023/075893 (10 pgs.).

* cited by examiner

```
@RequestMapping(value = "/sample", method = RequestMethod.GET)                                                    ← 502
@DelayMethod(tags={"default","samplecontroller","delay","sample1","delaysample1"},duration=2000)
@CheckClassAndCallback(tags={"default","samplecontroller","delay","sample1","checkclassandcallbacksample1"},className = SampleController.class,methodName = "sampleCallBack")    ← 504
public ResponseEntity<String> sample1 () {
    return new ResponseEntity< > ("Sample1 Success", HttpStatus.OK);
}

@RequestMapping(value = "/sample2", method = RequestMethod.GET)                                                   ← 506
@DelayMethod(tags={"default","samplecontroller","delay","sample2","delaysample2"},duration=4000,iteration=2)
@CheckClassAndCallback(tags={"default","samplecontroller","delay","sample2","checkclassandcallbacksample2"},className = SampleController.class,methodName = "sampleCallBack")    ← 508
public ResponseEntity<String> sample2 () {
    return new ResponseEntity< > ("Sample2 Success", HttpStatus.OK);
}

@RequestMapping(value = "/sample3", method = RequestMethod.GET)                                                   ← 510
@DelayMethod(tags={"default","samplecontroller","delay","sample3","delaysample3"},duration=4000,random=0.5)
@CheckClassAndCallback(tags={"default","samplecontroller","delay","sample3","checkclassandcallbacksample3"},className = SampleController.class,methodName = "sampleCallBack")    ← 512
public ResponseEntity<String> sample3 () {
    return new ResponseEntity< > ("Sample3 Success", HttpStatus.OK);
} public static void sampleCallBack( ) throws Exception
{
    throw new Exception("Sample Callback reached");
}
```

FIG. 5

```
14  public class ChaosDemoService {

16      private final TransactionDao transactionDao;

18      public ChaosDemoService(TransactionDao transactionDao) {
19          this.transactionDao = transactionDao;
20      }

22      @delayMethod(tags = {"default", "chaosdemoservice", "delay", "gettransactions", "delaygettransactions"}, duration = 3000)
23      @ConsumeMemoryAndCall(tags = {"default", "chaosdemoservice", "consumememoryandcall", "gettransactions", "consumememoryandcallgettransactions"}, amount = 0)
24      public Map getTransactions() {
25          Map result;
26          try {
27              result = transactionDao.getTransactionsMain();
28          } catch (Exception e) {
29              e.printStackTrace();
30              result = transactionDao.getTransactionsReserve();
31          }
32          return result;
33      }

35      @Scheduled(cron = "0 0/1 * * * *")
36      public void scheduledRetrieval() {
37          try {
38              log.info( message: "Total accumulated so far is: {}", transactionDao.getTransactionsTotalMain());
39          } catch (Exception e) {
40              e.printStackTrace();
41              log.info( message: "Total accumulated so far is: {}", transactionDao.getTransactionsTotalReserve());
42          }
43      }
```

FIG. 7

| Status | Method | Domain | File | Protocol | Type | Transferred | Size | Duration |
|---|---|---|---|---|---|---|---|---|
| 200 | GET | localhost:8080 | transactions | HTTP/1.1 | vnd.mozilla.json.view | 252.32 KB | 497.12 KB | 173 ms |
| | GET | localhost:8080 | favicon.ico | | | CSP | | 0 min |

FIG. 9

| Status | Method | Domain | File | Protocol | Type | Transferred | Size | Duration |
|---|---|---|---|---|---|---|---|---|
| 200 | GET | localhost:8080 | transactions | HTTP/1.1 | vnd.mozilla.json.view | 253.17 KB | 498.79 KB | 3.05 s |
| | GET | localhost:8080 | favicon.ico | | | CSP | | 0 min |

```
124  @Around("@annotation (DelayMethodToDuration) ")
125  public Object delayDuration (ProceedingJoinPoint interceptedJoinPoint) throws Throwable {
126      boolean executed = false;
127      Object object_to_return = null;
128      if (failsafe_allows_chaos_operation_in_the_environment && conditions_met_to_activate_tag() ) {
129          int target_duration = duration_from_annotation_unless_global_override_specified ();
130          log.info ("Threshold delay in the amount of { } will be introduced.", target_duration);
131          long timeWhenExecutionStarted = System.nanoTime ();
132          try {
133              object_to_return = interceptedJoinPoint.proceed(interceptedJoinPoint.getArgs()) ;
134              executed = true;
135          } finally {
136              long executionTime = (System.nanoTime() - timeWhenExecutionStarted) / 1000000;
137              if (executionTime < target_duration) {
138                  Thread.sleep(target_duration - executionTime);
139              }
140          }
141      }
142      if(!executed)
143      {
144          object_to_return = interceptedJoinPoint.proceed(interceptedJoinPoint.getArgs()) ;
145      }
146      return object_to_return;
147  }
```

FIG. 14

```
28    @DisableMethod(tags = {"default", "transactiondao", "disable", "gettotaltransactionsmain",
"disablegettotaltransactionsmain"})
29    public String getTransactionsTotalMain() {
30        return new RestTemplate().getForEntity( url:LocalConfig.getUrl( serviceName: "maintransactionsource")
+ aggregatedTransactions, String.class).getBody();
31    }
```

FIG. 15

```
Run: ChaosDemoApplication ×
  Console  Endpoints
                                                                                    database
  ...
  2022-08-17 01:54:00,013 scheduling-1 INFO [com.11bs.chaos.aop.ChaosJoinPointProcessor-disableMethod-507) - Disabling Method
  Call is triggered
  2022-08-17 01:54:00,021 scheduling-1 INFO [com.11bs.chaos.aop.ChaosJoinPointProcessor-disableMethod-507] - Disabling Method
  Call is triggered
  2022-08-17 01:54:00,022 scheduling-1 ERROR [org.springfrsuappomrt.e TawskoUtirls$kLo.ggisngcErrhorHeanddleur-hlanidlenErrgor.
  -95) – Unexpected error occurred in scheduled task
  ...
 Favorites  Structure
```

```
11  @Component
12  public class TransactionDao {

14      private final String detailedTransactions = "/demo/transaction/detailed";
15      private final String aggregatedTransactions = "/demo/transaction/aggregated";

17      @DisableMethod(tags = {"default", "transactiondao", "disable", "gettransactionsmain", "disablegettransactionsmain"})
18      @DelayMethod(tags = {"default", "transactiondao", "delay", "gettransactionsmain", "delaygettransactionsmain"})
19      public Map getTransactionsMain() {
20          return new RestTemplate().getForEntity( ut LocalConfig.getUrl( sericeName: "maintransactionsource") + detailedTransactions, Map.class).getBody();
21      }
```

FIG. 28

| Status | Method | Domain | File | Protocol | Type | Transferred | Size | Duration |
|---|---|---|---|---|---|---|---|---|
| 200 | GET | localhost:8080 | transactions | HTTP/1.1 | vnd.mozilla.json.view | 262.37 KB | 516.88 KB | 244ms |
| | GET | localhost:8080 | favicon.ico | | | CSP | | 0 min |

FIG. 29

| Status | Method | Domain | File | Protocol | Type | Transferred | Size | Duration |
|---|---|---|---|---|---|---|---|---|
| 200 | GET | localhost:8080 | transactions | HTTP/1.1 | vnd.mozilla.json.view | 263.18 KB | 518.42 KB | 151ms |
| | GET | localhost:8080 | favicon.ico | | | CSP | | 0 min |

FIG. 30

APPLICATION SCENARIO INJECTION AND VALIDATION SYSTEM

BACKGROUND

1. Field

The present disclosure relates generally to computer application validation and more specifically to injecting scenarios/chaos into an application during a validation process.

2. Description of the Related Art

The development process of a software product is usually driven by a set of functional requirements that the product must deliver. Such requirements, however, are often limited to describing what is known as "happy path"—a sequence of activities that will be executed if everything goes as expected without unexpected inputs, situations, or exceptions. Unexpected inputs, situations, or exceptions that fall outside of the clearly defined requirements are often merely given a prediction as to a likely software behavior, leading to gaps in system behavior for situations that were not fully thought through. Identifying such situations is challenging with the test coverage of the program being the reflection of requirements defined by program specifications in program space. As such, the outlying cases are usually not detected by the existing tests. Detecting abnormal situations requires either some manual intervention or may result in a production incident and/or malfunction.

SUMMARY

The following is a non-exhaustive listing of some aspects of the present techniques. These and other aspects are described in the following disclosure.

Some aspects include a process including identifying, by a computer system, one or more injection points in a flow of an application; determining, by the computer system, that a first injection point of the one or more injection points permits scenario injection; injecting, by the computer system, first scenario source code for a first scenario function at the first injection point in source code of the application; and storing, by the computer system, the application including the first scenario source code for the first scenario function.

Some aspects include a process including receiving, by a computer system, instruction to activate a first scenario function at a first insertion point in source code of an application, wherein the first scenario function includes first scenario source code in the source code of the application; activating, by the computer system, the first scenario function; running, by the computer system, the application when the first scenario function is activated, wherein the running the application when the first scenario function is activated causes the application to operate concurrently with the first scenario function; and providing, by the computer system, a first application output.

Some aspects include a tangible, non-transitory, machine-readable medium storing instructions that when executed by a data processing apparatus cause the data processing apparatus to perform operations including the above-mentioned processes.

Some aspects include a system, including: one or more processors; and memory storing instructions that when executed by the processors cause the processors to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements:

FIG. 5 illustrates a scenario source code injected into an application during the method of FIG. 3, in accordance with some embodiments of the present disclosure;

FIGS. 7-30 illustrate example screenshots of validating an application with injected scenarios during the method of FIG. 6, in accordance with some embodiments of the present disclosure.

Figure 1:
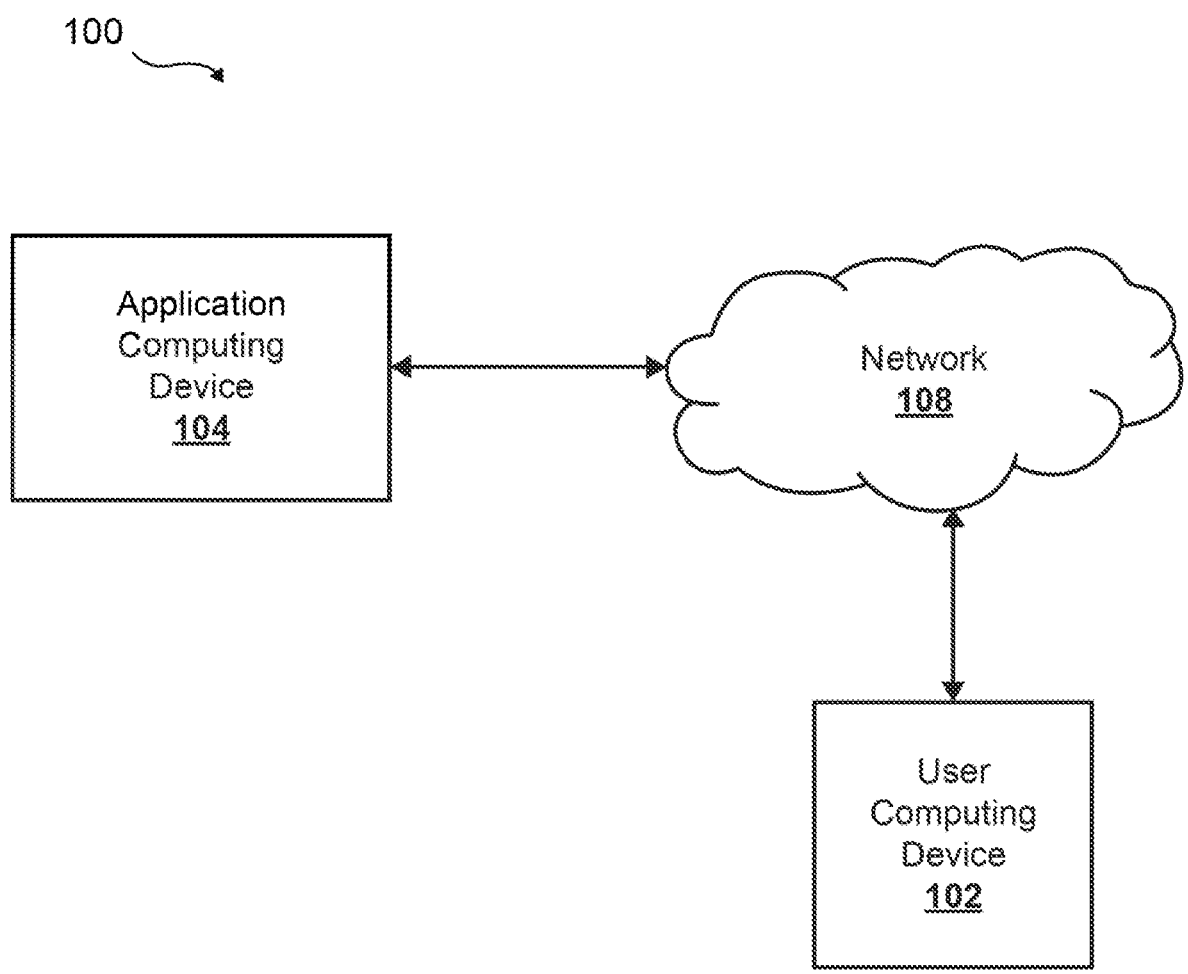
FIG. 1 is a block diagram illustrating an example of an application scenario injection and validation system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not yet foreseen) by others in the field of application validation and chaos engineering. Indeed, the inventor wishes to emphasize the difficulty of recognizing those problems that are nascent and will become much more apparent in the future should trends in industry continue as the inventor expects. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, software application reliability is traditionally addressed through a combination of test coverage, an educated guess of the development team(s), and remediation of production issues. A test coverage, be it a stress test running compressed production or a unit test verifying system response to an abnormal input, does not give full picture of anticipated system behavior in face of issues in the environment and its ability to discover faults is incidental. An educated guess about common weak points of the design that need to be reinforced remains a best guess. Finally, remediation of production issues requires production issues in the first place, and these are undesirable for business activity.

Chaos engineering approaches address this coverage gap by artificially creating the aforementioned situations and validating software behavior in the breakdown conditions. Augmenting existing testing setups with chaos engineering, the practice of validating system behavior through introduction of chaos, is a way to lift the veil from the unknown, evaluating the system behavior in the case of a real component or system crash. However, introducing chaos alone is not sufficient for complete validation of an application system as the timing component has to also be taken into account. The same breakdown happening before data transfer, in the middle of data transfer, or right after the data transfer will have completely different effect on the software behavior in each case. The traditional approaches for chaos engineering operate without connection to internal application state, but rather introduce chaos on the level of a network controller or a virtual machine or a physical host and hence do not provide the level of granularity needed to obtain full test coverage.

Modern software systems are sufficiently complex to make perceiving them in their entirety problematic. A failure in one portion of the system can have a ripple effect in other parts of the system or platform, disrupting components that only had minimum dependency on the affected system. Introduction of faults at random points of the system has a chance of exposing the chains of issues but such exposure is mostly incidental. To maximize the efficiency of disaster simulation, systems and methods take a white box approach and weave chaos testing infrastructure into the fabric of the platforms being tested, co-locating the chaos testing components with regular functional code instead of producing generic disruptions that are not context aware. Applying this approach achieves the highest value from chaos injection testing by allowing to precisely synchronize each stage of a component executing a specific business-critical operation with the ongoing disruption, giving full picture of the component preparedness to handle such a situation in a real environment. A black-box approach, on the other hand, prevents such integration and results in an incomplete picture of component behavior under breakdown conditions, leaving open the possibility that some states of the business process happened before the chaos injection or were never on the execution path because of chaos-injection, as synchronizing independent distributed components running on different virtualization layers is a technically challenging task.

Practical implementation of the proposed white-box model on a distributed system has two main ways of approaching the solution: either creating abnormal situations in the downstream components of the system or simulating it in the upstream components. For the cases where only sending (upstream) or receiving (downstream) components are within the perimeter and are easily modifiable (as is the case for components residing on system boundaries), the approach may be defined by the domain being controlled; sending components use simulation of destination having issues, whereas receiving components create real disruptions on receiving traffic. The components that are in the middle of system perimeter, however, allow both approaches to be applied.

FIG. 1 depicts a block diagram of an example of an application scenario injection and validation system 100, consistent with some embodiments. In some embodiments, the application scenario injection and validation system 100 may include a user computing device 102 and an application computing device 104. While one user computing device 102 and one application computing device 104 are illustrated and discussed, one of skill in the art will recognize that the application scenario injection and validation system 100 may include a plurality of user computing devices or a plurality of application computing devices. The user computing device 102 and the application computing device 104 may be in communication with each other over a network 108. In various embodiments, the user computing device 102 may be associated with a user (e.g., in memory of the application scenario injection and validation system 100 in virtue of user profiles). These various components may be implemented with computing devices like that shown in FIG. 33.

In some embodiments, the user computing device 102 may be implemented using various combinations of hardware or software configured for wired or wireless communication over the network 108. For example, the user computing device 102 may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, a user badge, or other user computing devices. In some embodiments, the user computing device 102 may include various combinations of hardware or software having one or more processors and capable of reading instructions stored on a tangible non-transitory machine-readable medium for execution by the one or more processors. Consistent with some embodiments, the user computing device 102 includes a machine-readable medium, such as a memory that includes instructions for execution by one or more processors for causing the user computing device 102 to perform specific tasks. In some embodiments, the instructions may be executed by the one or more processors in response to interaction by the user. One user computing device is shown, but commercial implementations are expected to include more than one million, e.g., more than 10 million, geographically distributed over North America or the world.

The user computing device 102 may include a communication system having one or more transceivers to communicate with other user computing devices or the application computing device 104. Accordingly, and as disclosed in further detail below, the user computing device 102 may be in communication with systems directly or indirectly. As used herein, the phrase "in communication," and variants thereof, is not limited to direct communication or continuous communication and may include indirect communication through one or more intermediary components or selective communication at periodic or aperiodic intervals, as well as one-time events.

For example, the user computing device 102 in the application scenario injection and validation system 100 of FIG. 1 may include a first (e.g., relatively long-range) transceiver to permit the user computing device 102 to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The user computing device 102 additionally may include second (e.g., short-range relative to the range of the first transceiver) transceiver to permit the user computing device 102 to communicate with each other or other user computing devices via a direct communication channel. Such second transceivers may be implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the user computing device 102 to communicate with each other or other user computing devices via an ad-hoc or other wireless network.

The application scenario injection and validation system 100 may also include or may be in connection with the application computing device 104. For example, the application device 104 may include one or more server devices, storage systems, cloud computing systems, or other computing devices (e.g., desktop computing device, laptop/notebook computing device, tablet computing device, mobile phone, etc.). In various embodiments, the application computing device 104 may also include various combinations of hardware or software having one or more processors and capable of reading instructions stored on a tangible non-transitory machine-readable medium for execution by the one or more processors. Consistent with some embodiments, the application device 104 includes a machine-readable medium, such as a memory (not shown) that includes instructions for execution by one or more processors (not shown) for causing the application computing device 104 to perform specific tasks. In some embodiments, the instructions may be executed by the one or more processors in response to interaction by the user. The application computing device 104 may also be maintained by an entity with which sensitive credentials and information may be exchanged with the user computing device 102. The application computing device 104 may further be one or more servers that hosts applications for the user computing device 102. The application computing device 104 may be more generally a web site, an online content manager, a service provider, a healthcare records provider, an electronic mail provider, a title insurance service provider, a datacenter management system, a financial institution or other entity that utilizes an application in its services.

The application computing device 104 may include various applications and may also be in communication with one or more external databases, that may provide additional information or data objects that may be used by the application computing device 104. While a specific application scenario injection and validation system 100 is illustrated in FIG. 1, one of skill in the art in possession of the present disclosure will recognize that other components and configurations are possible, and thus will fall under the scope of the present disclosure.

Figure 2:
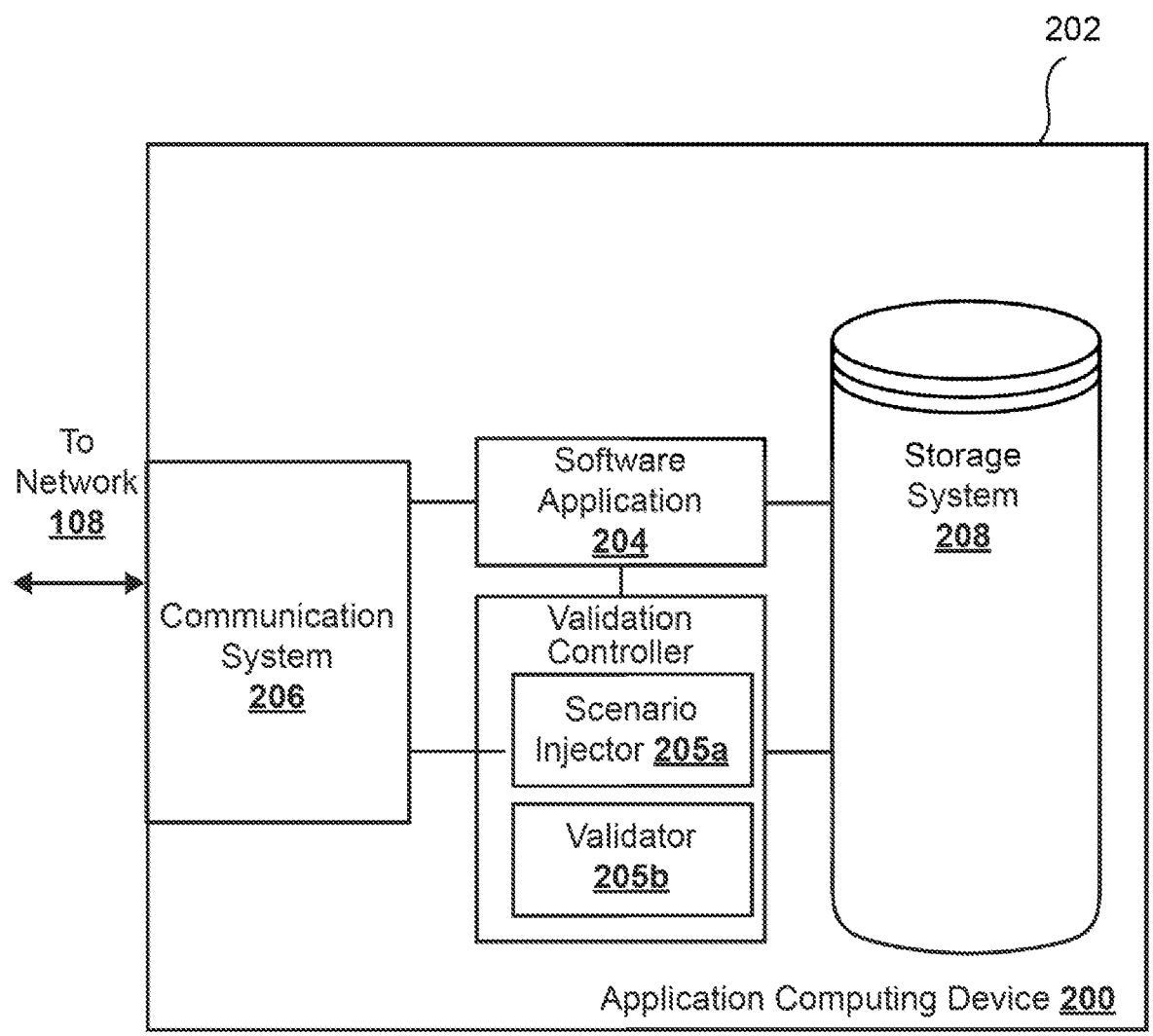
FIG. 2 is a block diagram illustrating an example of an application computing device of the application scenario injection and validation system of FIG. 1, in accordance with some embodiments of the present disclosure.

FIG. 2 depicts an embodiment of an application computing device 200, which may be the application computing device 104 discussed above with reference to FIG. 1. However, in some embodiments, various components and processes discussed as being provided by the application computing device 104/200 may be provided or executed at the user computing device 102. In the illustrated embodiment, the application computing device 200 includes a chassis 202 that houses the components of the application computing device 200, only some of which are illustrated in FIG. 2. For example, the chassis 202 may house a processing system (not illustrated) and a non-transitory memory system (not illustrated) that includes instructions that, when executed by the processing system, cause the processing system to provide an application 204 that is configured to perform the functions of the software applications/platforms/systems, or the application computing devices discussed below. Specifically, the application 204 may provide a service and is the application that is to be validated or tested by injecting scenarios into the application 204, as discussed in further detail below.

The processing system and the non-transitory memory system may also include instructions that, when executed by the processing system, cause the processing system to provide a validation controller 205 that is configured to perform the functions of the validation controller, or the application computing device discussed below. For example, the validation controller 205 may include scenario injector 205a used to inject one or more scenario functions (e.g., a chaos function) in the application 204 at various injection points (e.g., join points) in the application 204. The scenario functions may be executed during the running of the application 204, as discussed in further detail below. The validation controller 205 may also include a validator 205b that monitors the application 204 when the application is running with active scenario functions. The validator 205b may be used to determine whether the application 204 is operating as it should during a scenario(s) occurring as a result of the operation of the scenario function(s), as discussed in further detail below.

The chassis 202 may further house a communication system 206 that is coupled to the application 204 or the validation controller 205 (e.g., via a coupling between the communication system 206 and the processing system) and that is configured to provide for communication through the network 108 of FIG. 1 as detailed below. The communication system 206 may allow the application computing device 200 to send and receive information over the network 108 of FIG. 1.

The chassis 202 may also house a storage device (not illustrated) that provides a storage system 208 that is coupled to the application 204 or the validation controller 205 through the processing system. The storage system 208 may be configured to store application source code 210, a scenario function library 212, or other data or instructions to complete the functionality discussed herein. In various embodiments, the storage system 208 may be provided on the application computing device 200 or on a database accessible via the communication system 206. Furthermore, while the application 204 or the validation controller 205 are illustrated as being located on the application computing device 104/200, the application 204 or the validation controller 205 may be included on the user computing device 102 of FIG. 1. For example, the application 204 may be executed on a server computing device that is provided by the application computing device 200 while a user operates the validation controller 205 on the user computing device 102 remotely over the network 108. While a specific application computing device 200 is illustrated in FIG. 2, one of skill in the art in possession of the present disclosure will recognize that other components and configurations are possible, and thus will fall under the scope of the present disclosure.

Figure 3:
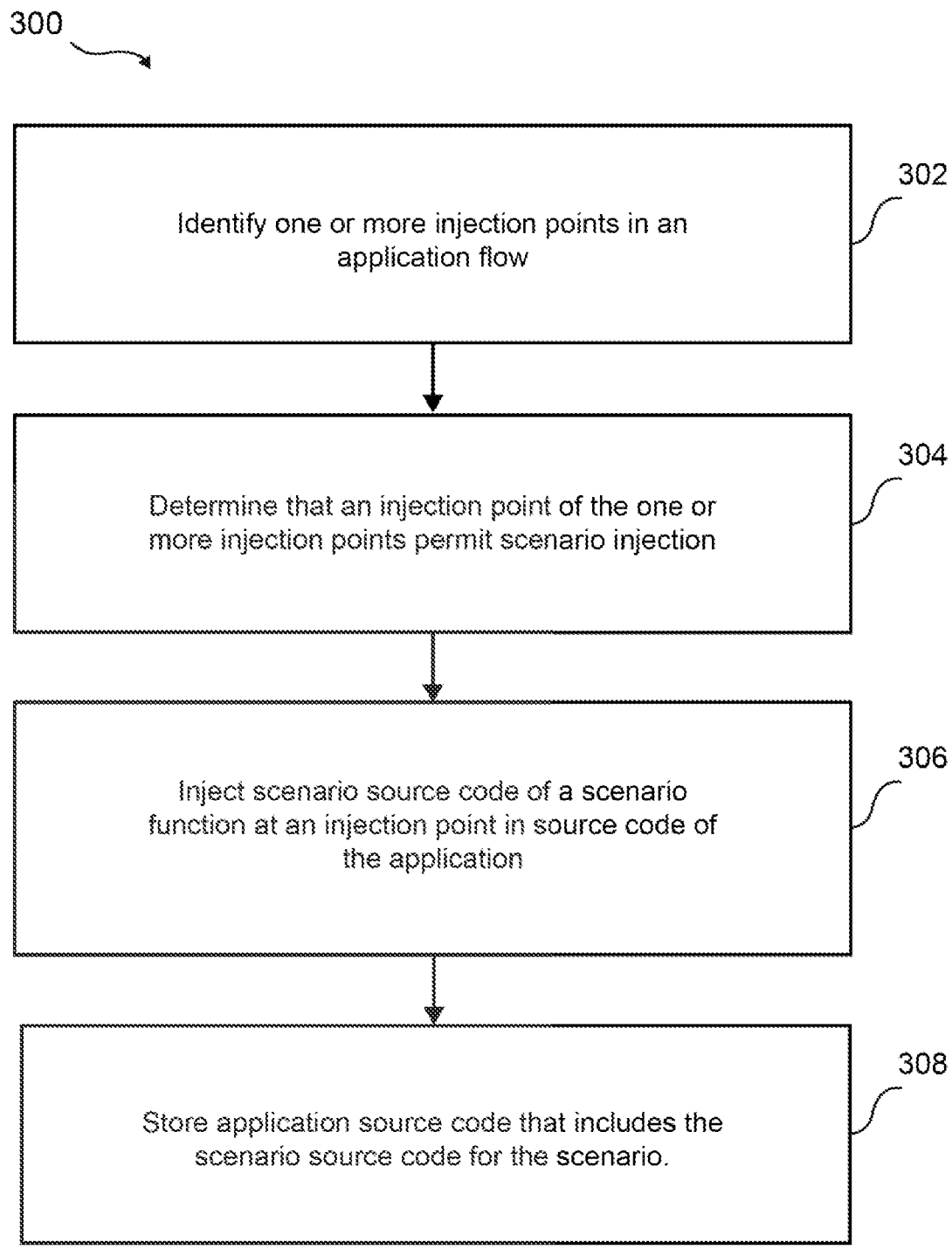
FIG. 3 is a flow chart illustrating an example of a method of injecting scenarios in the source code of an application in the application scenario injection and validation system, in accordance with some embodiments of the present disclosure.

FIG. 3 depicts an embodiment of a method 300 of scenario injection, which in some embodiments may be implemented with at least some of the components of FIGS. 1 and 2 discussed above. As discussed below, some embodiments make technological improvements to software validation and testing. In a variety of examples, the systems and methods of the present disclosure inject scenario code directly into an application's source code such that the scenario can operate during specific points of the application. In some embodiments, deep integration of scenario (e.g., chaos) injection with source code allows scenario operation on the level of individual instructions being executed within the application and achieve precise synchronization between the exact point in the program flow and the moment the issue occurs. When the scenario includes chaos scenarios, such level of integration is achieved by utilizing the paradigm of aspect-oriented programming and treating chaos injection as a cross-cutting concern. The developer is given an option to select which types of chaos injection are applicable to the given method call through a set of functions (e.g., advices) and their parameters governing the specifics of chaos operation. These advices are established as interceptable injection points (e.g., join points) with a central injection point processor injecting chaos functionality in application flow, whenever a recognized injection point is discovered and factors associated with the injection point permit chaos or other scenario injection.

The method 300 is described as being performed by the application 204 or the validation controller 205 included on the application computing device 104/200. Furthermore, it is contemplated that the user computing device 102 may include some or all the functionality of the application 204 or the validation controller 205. As such, some or all of the steps of the method 300 may be performed by the user computing device 102 and still fall under the scope of the present disclosure. As mentioned above, the application computing device 104/200 may include one or more processors or one or more servers, and thus the method 300 may be distributed across the those one or more processors or the one or more servers.

The method 300 may begin at block 302 where one or more injection points are identified in a flow of an application. In an embodiment, at block 302, an application (e.g., the application 204) may be provided. The application 204 may include the application source code 210 and may include one or more subservices in a distributed software system. In some embodiments, the application 204 and the application source code 210 may be provided by a Java Spring framework, however other application frameworks that permit aspect-oriented programming are contemplated as falling under the scope of the present disclosure as well. As would be appreciated by a person of skill in the art in possession of the present disclosure, aspect-oriented programming is a programming paradigm that aims to increase modularity by allowing the separation of cross-cutting concerns. It does so by adding behavior (e.g., advice) to existing code without modifying the code itself, instead separately specifying which code is modified via a "pointcut" specification. This allows behaviors that are not central to the logic (such as logging) to be added to a program without cluttering the code core to the functionality.

Aspect-oriented programming can help with minimizing the code changes required to support deep integration of scenarios such as chaos. Aspect-oriented programming entails breaking down program logic into distinct parts (so-called concerns, cohesive areas of functionality). Many programming paradigms support some level of grouping and encapsulation of concerns into separate, independent entities by providing abstractions (e.g., functions, procedures, modules, classes, methods) that can be used for implementing, abstracting and composing these concerns. Some concerns "cut across" multiple abstractions in a program, and defy these forms of implementation. These concerns are called cross-cutting concerns or horizontal concerns. For example, aspect-oriented programming would classify introduction of chaos to existing code as a cross-cutting concern. The handling of cross-cutting concerns is achieved through reliance on the concept of join point (identifiable point in the program execution which is a candidate for aspect application), advice (additional command defining how the join point will be processed), pointcut (special methods, which intercept calls at join points and execute additional logic based on the specified advice and filter) and aspect (the implementation of cross-cutting functionality). In the Java Spring framework, the support of aspect-oriented programming is provided by AspectJ or Spring AOP. While AspectJ offers significantly more capabilities, Spring AOP—through automatic creation of proxies for all Spring components— allows to perform zero-code integration into the existing codebase without need for separate aspect weavers.

In various embodiments, the validation controller 205 via the scenario injector 205a may identify one or more injections points (e.g., join points) in the flow of the application 204. However, in other embodiments, a developer may manually identify the injection points in the application 204. For example, a join point may be any candidate point for aspect application (e.g., the point of control flow in which it can be intercepted and modified as needed). For Spring AOP, it may include method execution, and for AspectJ, it may also involve initialization of variables. Outside of a handful of debugging scenarios, however, a developer may want to apply the operations to a specific sub-set of join points only. The developer may mark these join points and the program automatically searches for and recognizes the developer's marks every time when a join point is encountered, selecting only a subset of join points that are marked to do additional verifications on and not wasting CPU cycles on join points which are irrelevant. For the chaos framework example described herein, the developer also uses the markers to specify what the developer wants to be done at that point if conditions permit, reducing the complexity of decision-making for the code, when a marked join point is encountered. An automatic option, with the application computing device 104/200 automatically coordinating injection and action selection without developer involvement may also be performed.

Figure 4:
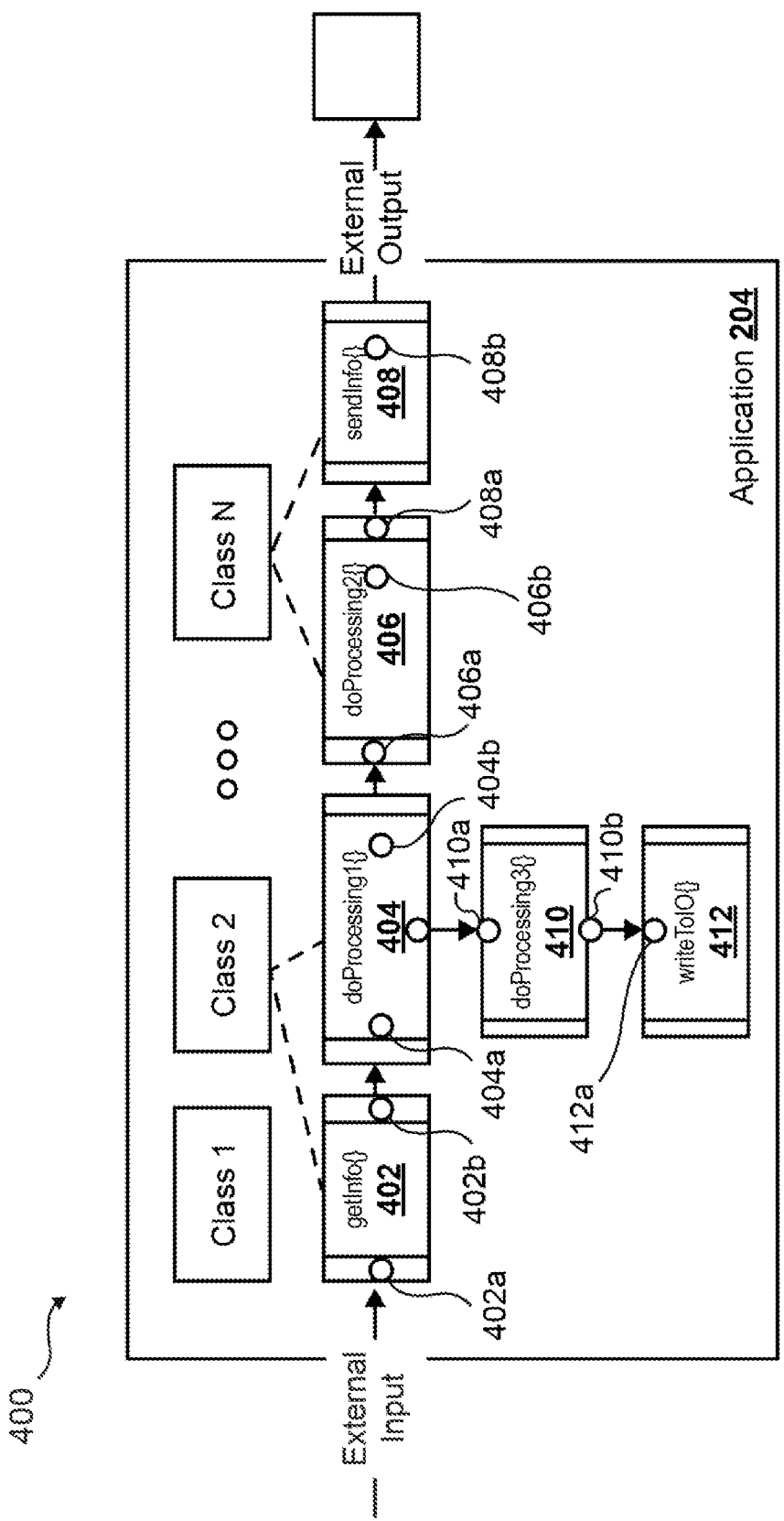
FIG. 4 illustrates a block diagram of identified injection points in the application included in the application scenario injection and validation system during the method of FIG. 3, in accordance with some embodiments of the present disclosure.

FIG. 4 illustrates an example of identified injection points in the application 204. As illustrated, a call 402 may include injection points 402a and 402b, a call 404 may include injection points 404a and 404b, a call 406 may include injection points 406a and 406b, a call 408 may include injection points 408a and 408b, a call 410 may include injection points 410a and 410b, and a call 412 may include injection point 412a. Scenarios or advices can be applied to one or more these injection points or join points. As discussed in further detail below, the chaos scenarios or other scenarios can be performed instead of further program flow, as a step before or after further flow or applied in concurrency with the flow. Depending on the implementation technology, variables and parameters can also become targets for injection.

The method 300 may proceed to block 304 where it is determined that an injection point of the one or more injection points permits scenario injection. In an embodiment, at block 304, the scenario injector 205a may determine which injection points permit scenario injection such as, for example, chaos advices. For example, the scenario injector 205a may determine the injection point to inject one or more scenarios based on factors such as the scenario that is to be injected, the application call that the injection point is located, a position within the call, calls upstream or downstream from the injection point, or other factors that would be apparent to one of skill in the art in possession of the present disclosure.

The injected scenario code may be referred to as annotations. When the scenario includes chaos, annotations supported by the framework can be classified into four broad categories: breakdown, delay, resource consumption and expansion annotations. Each of these categories may have a distinct application within the framework. In various embodiments, a breakdown annotation simulates a complete failure of a component. Examples of such failure include service being unavailable, container down or a critical error in a method call preventing execution. An application that encounters such disruption can approach handling it through retries (which will work if the disruption is set to be intermittent), alternative execution pathways (if such pathways are available) or graceful failure, if all options are exhausted.

In various embodiments, a delay annotation simulates a behavior of a system under heavy load. Examples of such situations include operation under reduced capacity, unexpected input breaching size, pattern or frequency assumptions or situations related to validating system operation under peak service level agreement (SLA) or a service level objective (SLO) values to ensure that the application 204 operation remains acceptable in such conditions. An application 204 that encounters such disruption can approach it through load balancing (if other unaffected nodes or components with similar functionality are available), alternative execution pathways (if such pathways are available), prioritization and selective failure to reduce the needed throughput (if applicable) or graceful handling of reduced capacity, if all options are exhausted.

In various embodiments, a resource consumption annotation may create a heavy load on memory and processing resources. These annotations are intended to explore the effects that resource starvation has on method being called, as well as on the application 204 and system overall. An application 204 that encounters resource shortage can approach it through load balancing to other unaffected nodes (if such are available), breaking down the load into smaller chunks (if applicable for the load type), applying less resource-intensive alternative processing algorithms (if applicable and available, e.g., doing part of the processing against hard drive instead of keeping data in memory) or graceful failure, if all options are exhausted. In various embodiments, an expansion annotation is intended to test alternative execution paths and connect custom functionality to the framework operation. Expansion chaos may allow injection of arbitrary code into execution flow or change the execution flow altogether on the fly. Examples of expansion include changing global operational control variables right before a call is made or running complex custom test scenarios that involve additional layers of failures or simultaneous triggering of multiple calls.

Like real disruptions in production or normal mode, unless explicitly muted for testing purposes, the simulated disruptions discussed above may trigger proper logging and notifications even if the call eventually succeeds. Furthermore, the annotations themselves may support one or more parameters. For example, an annotation may include tags or a list of tags that activate the annotation and defaults to a "default" tag when no tags are active. The default tag may prevent the annotation from being executed. Another parameter may include exclusions which may include a list of tags that need to be ignored and is defaulted to an empty list. Another parameter that may be included in the annotation may be iteration where every nth activation of the annotation will trigger action. The iteration parameter may be disabled by default (defaults to "1") and setting it to a value greater than "1" makes the applied disruption intermittent. In various embodiments, the annotation may include a random parameter. The random parameter, if the value is not negative, every activation of the annotation has a probability of n to trigger action. Disabled by default (defaults to −1.0). Setting it to a value between 0.0 and 1.0 will make the applied disruption probabilistically intermittent.

In various embodiments, in the chaos injection example, the example chaos annotations/advices may include the following identified in the below table, however, other scenario injections may be contemplated:

| Name | Description | Java Spring Implementation Details |
|---|---|---|
| @DisableMethod | Interrupts the command flow and throws exception. | This advice is activated before the annotated method call. Upon activation of this advice the original command flow is aborted, and the method that was annotated with this advice is not executed. Instead, a call is made to a method throwing an exception. |

-continued

| Name | Description | Java Spring Implementation Details |
|---|---|---|
| @DelayMethod | Introduces a fixed delay. The underlying method is triggered after delay. | This advice is activated before the annotated method call. Upon activation of this advice the original command flow is suspended for the specified duration of time in milliseconds. Once the delay is over, the command flow is resumed. |
| @DelayMethodToDuration | Introduces a minimal delay. The underlying method is triggered right away, but if it returns before the specified minimal delay, the command flow will be paused until the minimal delay is reached. | This advice is activated around the annotated method call. Upon activation of this advice the current time is recorded and the original command flow is allowed to proceed. Once the annotated method finishes its execution, the execution time (calculated as the difference between the current time and the recorded time) is subtracted from the specified duration of time in milliseconds. If the result is greater than zero, the command flow is suspended for the amount of milliseconds in the result, to ensure that the method call takes at least the specified amount of time to complete. |
| @CheckBeanAndCallback | Attempts to locate and execute the specified method from the bean before executing the annotated method. | This advice is activated before the annotated method call. Upon activation of this advice there is an attempt to retrieve the bean specified in the parameters through Spring ApplicationContext and make a call to the specified method inside that bean. Once the call to the specified method is over or if the method could not be located, the original command flow is resumed. |
| @CheckClassAndCallback | Attempts to directly execute the specified static method from the class before executing the annotated method. In case of failure to locate static method with given description attempts to search for a bean with a non-static method that matches the description and, if this search also fails, attempts to create a new instance of the specified class, and call the specified method in that instance. | This advice is activated before the annotated method call. Upon activation of this advice there is an attempt to locate the class specified in the parameters through a Java reflection call and make a call to the specified static method inside that class without instantiating the class. If the call fails, the code attempts to leverage Spring ApplicationContext to find a bean with a method that would match the provided description and call that method. If this search also fails, the code attempts to instantiate the class matching the description and call the described method from this new instance. Once the call to the specified method is over or if the method could not be located, the original command flow is resumed. |

-continued

| Name | Description | Java Spring Implementation Details |
|---|---|---|
| @ReplaceCallFromBean | Attempts to locate and execute the specified method from the bean instead of executing the annotated method. | This advice is activated around the annotated method call. Upon activation of this advice there is an attempt to retrieve the bean specified in the parameters through Spring ApplicationContext and make a call to the specified method inside that bean. Unlike @CheckBeanAndCallback this advice interrupts the original command flow, returning the value from the method that was specified in the parameters or an exception if the method could not be found. The method that was annotated with that advice will not be executed. |
| @ReplaceCallFromClass | Attempts to directly execute the specified static method from the class instead of executing the annotated method. In case of failure to locate static method with given description defaults to @ReplaceCallFromBean. | This advice is activated around the annotated method call. Upon activation of this advice there is an attempt to locate the class specified in the parameters through a Java reflection call and make a call to the specified static method inside that class without instantiating the class. If the call fails, the code attempts to leverage Spring ApplicationContext to find a bean with a method that would match the provided description and call that method. If this search also fails, the code attempts to instantiate the class matching the description and call the described method from this new instance. Unlike @CheckClassAndCallback this advice interrupts the original command flow, returning the value from the method that was specified in the parameters or an exception if the method could not be found. The method that was annotated with that advice will not be executed. |
| @ConsumeCpu | Triggers a CPU ballast computation loop. | This advice is executed before the annotated method call. It creates a thread pool with the number of threads in the pool corresponding to the parameter being passed and sets each thread to concurrently execute an infinite loop iterating a variable. Depending on the timeout setting in the parameters the resulting ballast load can be either left running indefinitely or be unwinded once timeout is reached. In the latter scenario, the original command flow is resumed after unwinding. |
| @ConsumeCpuAndCall | Triggers a CPU ballast computation loop and | This advice is executed around the annotated method |

-continued

| Name | Description | Java Spring Implementation Details |
|---|---|---|
| | performs a call to the annotated method in the middle of stress test, after the ramp-up is complete. | call. It creates a thread pool with the number of threads in the pool corresponding to the parameter being passed and sets each thread to concurrently execute an infinite loop iterating a variable. Once the ramp-up is completed and the ballast load is running, the annotated method is executed. If this execution throws an exception, the ballas load in unwinded right away. Otherwise, upon finishing the execution of the annotated method, depending on the timeout setting in the parameters the ballast load can be either left running indefinitely or be unwinded once timeout is reached. In the latter scenario, the original command flow is resumed after unwinding. |
| @ConsumeMemory | Allocates memory for object storage and holds it for the given duration. | This advice is executed before the annotated method call. It allocates arrays of integers of specified block size to use up the available memory. The amount of memory it consumes is controlled through a parameter, allowing to consume a specific amount of memory, consume all available memory up to a single block size or consume all the memory up to throwing an out of memory exception. Depending on the timeout setting in the parameters the resulting ballast load can be either left running for as long as the tags activating the consumption are active or be unwinded once timeout is reached. Unless an out of memory error is thrown, once the timeout is over (or, in case of infinite timeout, once the command deactivating the tags is received), the memory allocation is ramped down and the original command flow is resumed. |
| @ConsumeMemory AndCall | Allocates memory for object storage, holds it for the given duration and performs a call to the annotated method in the middle of stress test, after the memory allocation is complete. | This advice is executed around the annotated method call. It allocates arrays of integers of specified block size to use up the available memory. The amount of memory it consumes is controlled through a parameter, allowing to consume a specific amount of memory, consume all available memory up to a single block size or consume all the memory up to throwing an out of memory exception. Depending on the timeout setting in the parameters the resulting |

| Name | Description | Java Spring Implementation Details |
|---|---|---|
| | | ballast load can be either left running for as long as the tags activating the consumption are active or be unwinded once timeout is reached. Unless an out of memory error is thrown, once the timeout is over (or, in case of infinite timeout, once the command deactivating the tags is received) the annotated method is executed prior to memory allocation being ramped down and the original command flow is resumed. |

The method 300 may proceed to block 306 where scenario source code for a scenario function is injected at an injection point in source code of the application. In an embodiment, at block 306, the scenario injector 205a may inject an injection point with source code for any scenario (e.g., chaos advice) that was identified to be injected into that injection point. As such, an injection point may have one or more scenarios injected at that injection point. However, some injection points may not be associated with a scenario and thus, may not have a scenario's source code injected at an injection point.

In various embodiments, the scenario injector 205a may inject one or more tags with each scenario. In an embodiment, each scenario may include a failsafe switch tag. In order to prevent accidental activation, the validation controller 205 may be equipped with a failsafe switch that turns chaos functionality off by default, unless explicitly turned on through startup configuration. This mechanism allows to safely deploy the product with embedded chaos functionality to production without any additional risks or concerns. The tags may be inserted to provide a level of granularity of which scenarios are being activated such that scenarios that have the same tag are activated when that tag is activated. The tags also reduce computational costs when the application 204 is operated as the system searches for only the declared tags and ignores the rest of the annotations that do not include the activated tag or tags.

For example, a chaos advice 502, 504, 506, 508, 510, and 512 are illustrated in FIG. 5. Each chaos advice 502-512 may include a plurality of tags. The tags specified in the example of FIG. 5 start from the global tag (e.g., "default" tag) active for all chaos-enabled endpoints within the platform, then go to class level "samplecontroller" in this case, followed by the injection class ("delay" or "callback" in the example), followed by the method name and followed by a combination of injection class and method name. Each of the tags can be activated separately or multiple tags can be activated at once. Additional tags can be added as needed to the desired level of granularity.

The validation controller 205 or the application 204 with a chaos injecting component keeps track of the tags that are currently active. Tags can be activated and deactivated through a startup configuration or via an application programming interface (API) and are controlled in a central manner through a set. Whenever there is a call to a method that is labeled with one of the chaos advices, the validation controller 205 or the application 204 verifies for each chaos advice associated with the method being called, whether there is a match between the tags that are currently active and one of the tags specified for the advice. If there is no match, the normal, non-chaotic flow is allowed to proceed, otherwise the chaotic component performs the chaos injection that is coded for the requested tag. For the example in FIG. 5, triggering the tag "delay" will introduce delay for all calls to the tagged methods, with the difference in delay application controlled through parameters—a call to sample1( ) will be delayed by 2 seconds for every call, a call to sample2( ) will be delayed by 4 seconds, but only every second iteration and finally each call to sample3( ) has a 50% chance of incurring a 4 second delay. If the "callback" tag is activated instead, the call to sample1( ) will only force the callback to sampleCallBack( ) method located in SampleController class, which would throw an exception instead of creating and returning a new String object that it would have done in the normal flow. If both the "delay" and the "callback" tags are active, the call to sample1( ) will first cause a 2 second delay executing the @DelayMethod advice, followed by the @CheckClassAndCallBack advice calling the method that throws the exception.

Tagged annotation for chaos engineering make technological improvements to computer systems and software validation. In modern software development practice, the business logic being encoded into the software product is usually estimated to only be a few percent of the code within that product with the rest being pre-existing common frameworks and libraries. Tagged annotations allows to focus chaos engineering efforts on the control points of the actual new code being developed for the project instead of a mechanical retesting of all possible points with common code included (using annotation localization instead of chaos injection locus localization). This in turn leads to a significant (several orders of magnitude) reduction of the number of test scenarios being executed. Thus, reducing processing cycles, memory utilization, storage utilization and other computer system component utilization.

Specifically, chaos injection itself does not take too much time to apply, but requires rerunning the test suite (or multiple test suites) on top of the disrupted software, with each combination of chaos injection being a separate test cycle execution (e.g. cycle 1: test suite execution on normal run, cycle 2: test suite execution on the code with first chaos tag group activation, cycle 3: test suite execution with second chaos tag group activation, cycle 4: test suite execution with both first and second chaos tag group activation, etc.) Considering that such exhaustive execution of all test scenarios can take an unacceptably high amount of time, the developer has the option to use annotations and tags to replace the exhaustive verification of all testing combinations with prioritization of a few high impact targets to reduce the time of testing and analysis.

The method 300 may proceed to block 308 where the application source code is stored including the scenario source code for the scenario. In an embodiment at, at block 308, the validation controller 205 may store the application and its application source code including the injected scenarios in the storage system 208 or at any other storage database. The application 204 with its modified source code may then be used for validating and testing the application as discussed below with respect to the method of FIG. 6.

Figure 6:
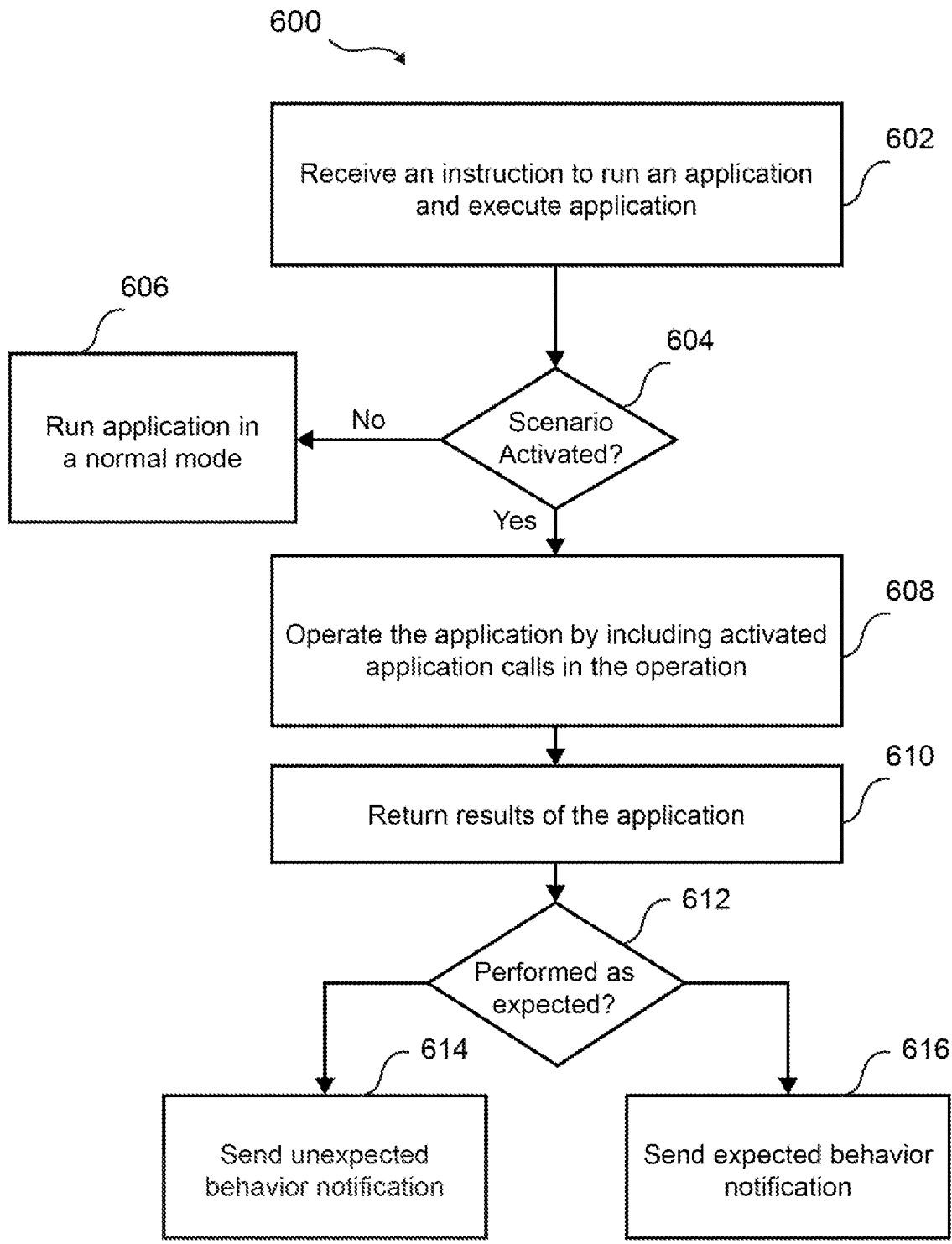
FIG. 6 is a flow chart illustrating an example of a method of application validation using injected scenarios, in accordance with some embodiments of the present disclosure.

FIG. 6 depicts an embodiment of a method 600 of application validation and testing where an application includes injected scenarios. The method 600 is described as being performed by the application 204 or the validation controller 205 included on the application computing device 104/200. Furthermore, it is contemplated that the user computing device 102 may include some or all the functionality of the application 204 or the validation controller 205. As such, some or all of the steps of the method 600 may be performed by the user computing device 102 and still fall under the scope of the present disclosure. As mentioned above, the application computing device 104/200 may include one or more processors or one or more servers, and thus the method 600 may be distributed across the those one or more processors or the one or more servers.

The method 600 may begin at block 602 where an instruction to run an application is received. In an embodiment, at block 602, the application computing device 200 may receive an instruction to run the application 204. In some embodiments, the user computing device 102, via an application programming interface (API) (e.g., a representational state transfer (REST) API), may send the instruction to run the application 204. In response, the application 204 may be executed.

The method 600 may proceed to decision block 604 where it is determined whether a scenario source code is activated. In an embodiment, at decision block 604, the validation controller 205 may determine whether any of the scenario source code within the application source code is activated. For example, where the application 204 is implemented on the Spring framework, Spring may monitor all annotated Spring proxy calls for activated tags associated with each of the scenario calls included in the application 204.

Prior to executing the application 204 or in some instances during the operation of the application 204, a developer operating the user computing device 102 may activate or deactivate scenario calls via the network 108. For example, via the API, the developer may make a POST request that identifies one or more tags that are to be activated.

If at decision block 604 the first scenario source code is deactivated, the method 600 may proceed to block 606 where the application is operated with the scenario source code not being run or ignored. In an embodiment, at block 606, the application 204 may ignore the scenario calls embedded within the application source code 210 when that scenario call is not activated. For example, if a tag for that scenario call is not activated, then the application 204 may operate in a normal mode as it would if it is deployed with an end user. Running the application when the scenario source code is deactivated causes the application to operate as if the scenario source code does not exist in the application source code of the application.

If at decision block 604 the scenario source code is activated, the method 600 may proceed to block 608 where the application is operated by running the scenario source code. Running the application 204 when the scenario source code is activated causes the application 204 to operate with the scenario function. In various embodiments, the application 204 may inject the scenario into the application 204. For example, a chaos scenario may be injected and executed. The application 204 may run until the instructions are completed.

In various embodiments, randomness and iteration count are applied for annotations for the application 204. If annotation has both a non-default probability p and a non-default iteration count n specified, a logical AND is applied meaning that every n-th iteration has a probability of p of triggering a chaos action.

Various aspects of the present disclosure are designed to have minimum impact on operation of underlying software outside of the actual chaos injection. Generating a true random number with sufficient entropy solely for the purpose of determining whether the chaos injection should happen this time can have a prohibitive cost on the application performance without adding additional value to the proposition. As a result, it is recommended to avoid complex secure randomness generators in favor of faster pseudo-random generators.

Furthermore, the iteration count is completed in a central manner. Any time when chaos is enabled and an annotated method with a non-default iteration count property gets a call, a central execution count map is used to track the number of iterations of that method's signature. Every n-th iteration trigger is realized through the remainder of division of the iteration count by n being equal to zero.

Whenever a chaotic injection is performed, the application 204 or the validation controller records a line in the logs with basic information about the chaos injection type being applied and configuration parameters that were provided. This record can be used to establish the start time of testing and for analysis of effects of the chaos injection on the application 204. For stress-related chaos injections, a second record is added once the stress test is over. Presence of such record helps confirm that the test ran to the end and establish the end time when analyzing the effects of chaos injection.

Having the application 204 that receives chaos injection under additional external hardware and software monitoring at the time of injection is recommended, as it allows to obtain a full picture of the performance of the application 204 beyond what is shown in the logs.

The method 600 may proceed to block 610 where the results of the application are returned. In an embodiment, at block 610, the application 204 may return the results of the application in response to the initial request. For example, the application may return an error notification if the scenario caused to application to generate an error message. In other embodiments, the application 204 may return a response that would be expected under normal conditions but with a delay in the time that the response is returned. Other responses may also be contemplated as would be apparent to one of skill in the art in possession of the present disclosure.

The method 600 may proceed to decision block 612 where it is determined whether the application performed as expected during operation of the application including the operation of the scenario. In an embodiment, at decision block 612, the validator 205b may determine whether the application 204 operates as expected or as desired (e.g., according to a service level agreement (SLA), a service level indicator (SLI), a service level objective (SLO) based on the SLI or the SLA, or any other criteria that would be apparent to one of skill in the art. As discussed in examples below, the validator 205b may operate to determine whether the application 204 failed gracefully in light of the chaos introduced during the operation of the application 204 or whether the application 204 performed unexpectedly. In various embodiments, SLI is the indicator that the system uses to determine criteria (e.g. number of seconds for page to load), SLA and SLO are conditions on top of SLI (e.g. customer will not be satisfied with the service if page load takes longer than 4 seconds more than once within a five minute interval (SLA) and hence, since normally it takes less than a second, the development team sets the system to send alerts to operations, if page takes longer than 2 seconds to load (SLO)).

If the application performed unexpectantly or in an inefficient manner at decision block 612, the method 600 may proceed to block 614 where a validation notification indicating that the application behaved unexpectantly may be provided to the developer. If the application performed unexpectantly or in an inefficient manner at decision block 612, the method 600 may proceed to block 616 where a validation notification indicating that the application performed as expected during operation of scenario is provided. In an embodiment, at blocks 614 and 616, the validator 205b may provide a validation notification indicating whether the application 204 operated as expected during operation of the scenario or not. For example, in some embodiments, the validator 205b may return a validation notification to the user computing device 102 such that the user may view whether the application 204 performed as expected. In some embodiments, the validation notification may only include the result of operating the application 204 such as the output that the application generated 204. In various embodiments, the validation notification may include an expected result. In yet other embodiments, the validation notification may include suggestions to improve the application.

FIGS. 7-30 illustrate various screenshots of application scenario injection and validation according to the systems and methods described herein. Specifically, the example illustrated in FIGS. 7-30 illustrates application of Java Spring implementation of chaos engineering to an application (e.g., application 204). The application that is injected with chaos has a functionality of retrieving data from a remote data source. The application includes an active scheduler that pulls the total aggregated amount of all transactions every minute and sends it to logs and the application is also capable of retrieving a list of all transactions on demand.

A controller may serve as an entry point for on-demand requests sent to the application via a REST API. In FIG. 7, example source code of a service of the application is illustrated. The service may handle requests from the controller and may run a scheduler. A data access object may handle retrieval of data from remote sources.

Figure 8:
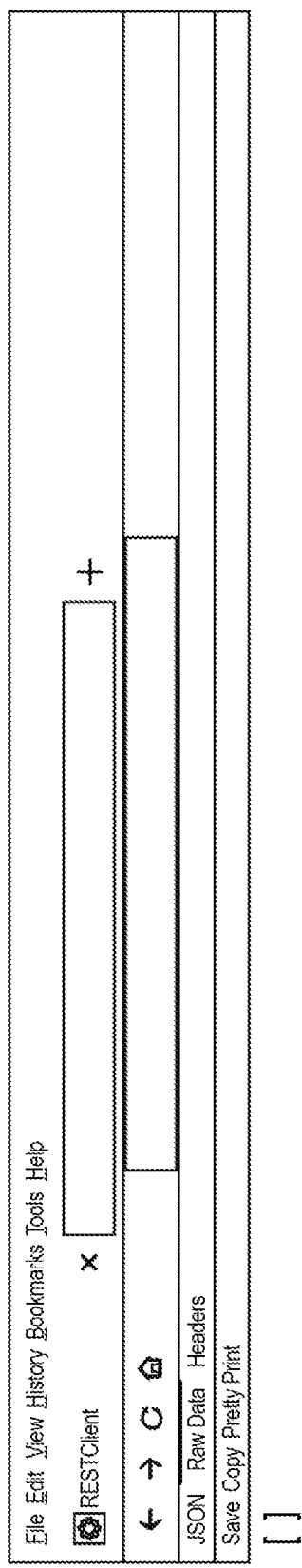

When the application is executed according to block 602 of method 600, the application may start in a normal mode and there are no active chaos tags as illustrated in FIG. 8 where an empty chaos tag list is returned upon request via the REST API. The request to produce a list of transactions, where the request caused the application to run, returns in 173 milliseconds as illustrated in FIG. 9.

Figure 10:
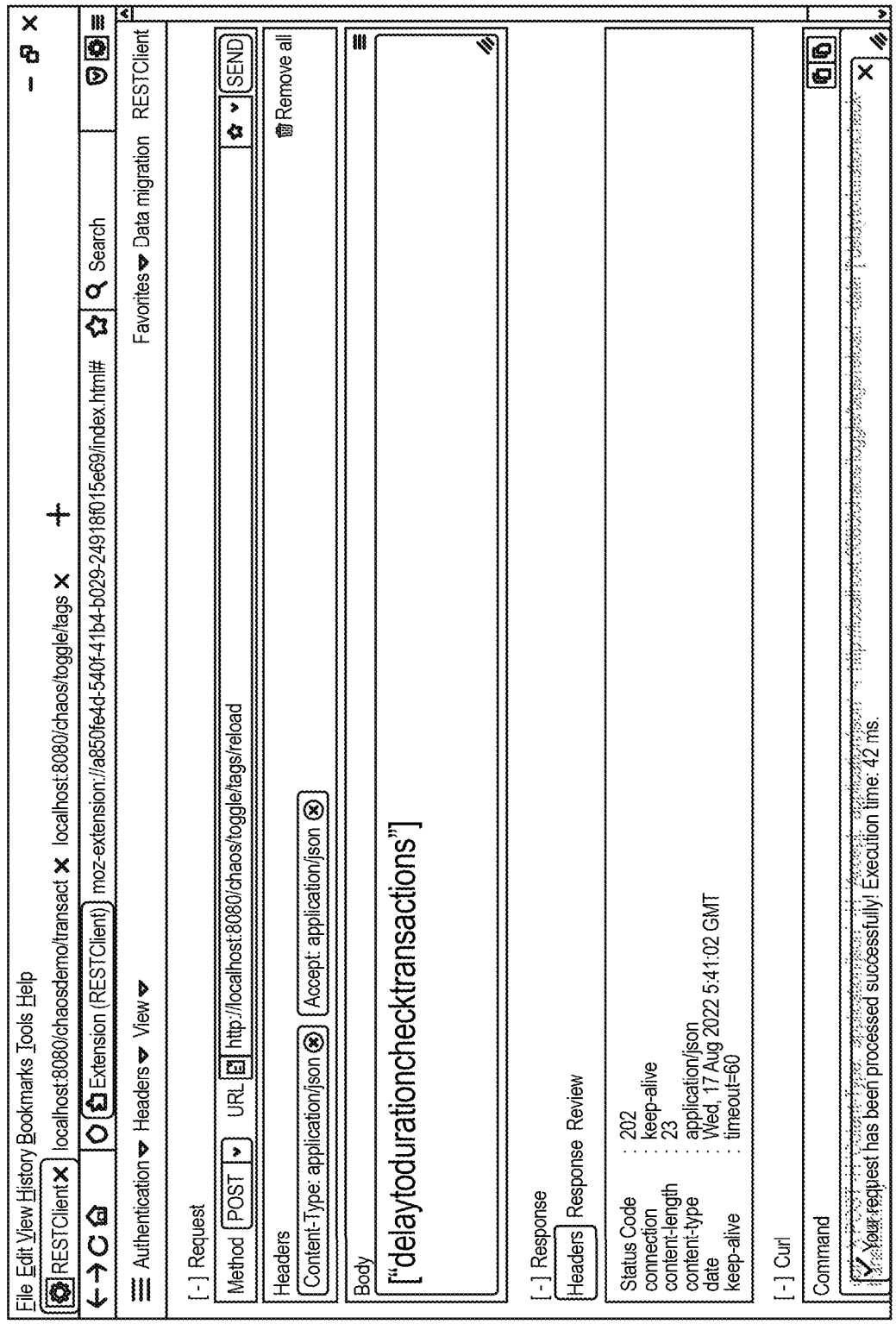
Figure 11:
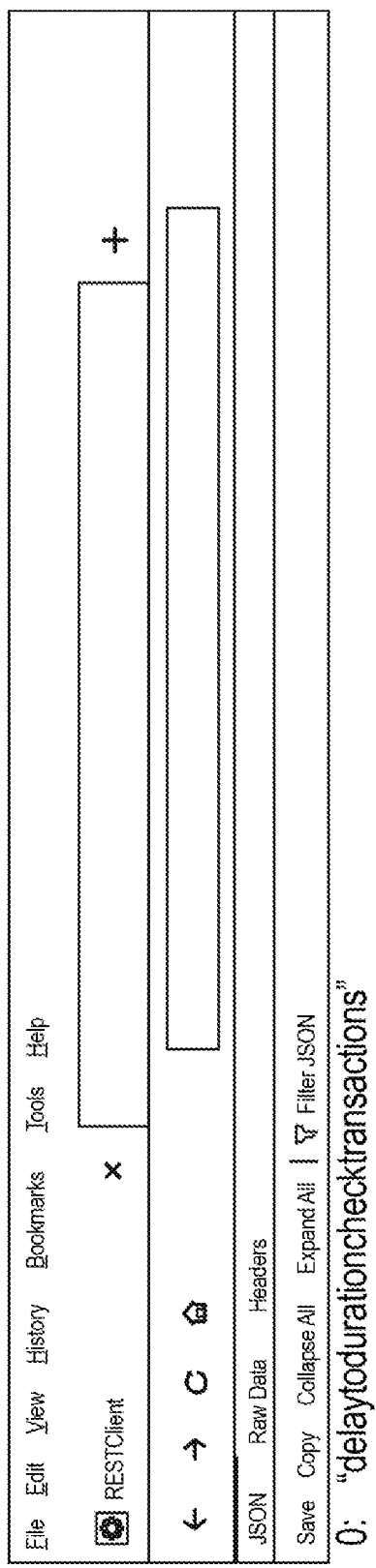

Subsequently, a developer may send a POST request to a chaos control endpoint activating a tag for a scenario of threshold delay on the controller. As illustrated in FIG. 10, the POST request may include the activation of the tag "delaytodurationchecktransactions." Such delays may be useful to monitor application operation at SLO and SLA thresholds and validate, whether such operation is in line with expectations or criteria. As illustrated in FIG. 10, the list of active tags is reloaded with a list containing a single "delaytodurationchecktransactions" element, which is the activating tag on returning the list of transactions. FIG. 11 illustrates an example tag control that now shows that the new tag was activated.

The application may run again, and upon chaos activation, the same request that took 175 milliseconds while the application was in normal mode now takes 3.05 seconds, as illustrated in FIG. 12, when the transaction list after chaos activation is retrieved. This delay is triggered through the following sequence of events happening within the code. The Spring framework may monitor all annotated Spring proxy calls for a match to the list of activated tags. Upon tag activation, all calls that had the activated tag in the list become injectable with chaos. In this case, the controller method responding to the call had an annotation for a threshold delay of 3 seconds (e.g., "duration=3000" in line 26 of FIG. 13) with the tag that was activated. As illustrated in FIG. 14, the implementation within the chaos library the "@DelayToDuration" annotation may have an "Around" advice. Whenever the "Around" advice is hit, it engages before the method execution and validates the tags and the extra parameters to determine, whether chaos injection should be made.

Figure 13:
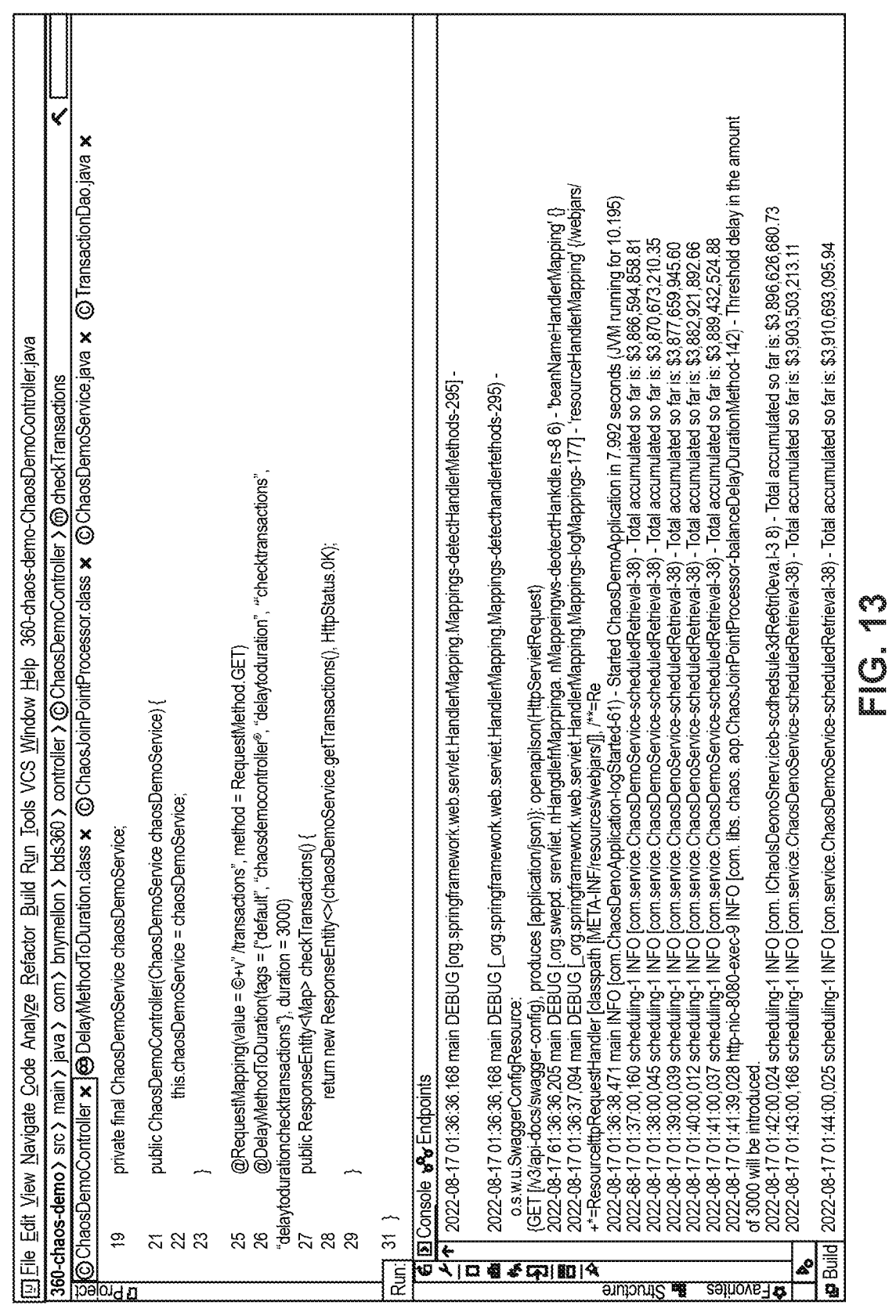

In the illustrated example, the conditions were met and hence the application extracted the duration provided in the annotation parameters as no overriding duration was specified. Further execution of the code causes recording the start time, indicating that chaos injection is happening in the logs that can be seen in FIG. 13, performing the operation and then, since the end time was likely still under 200 milliseconds, suspending the operation for the remainder of the time till the threshold is satisfied. Once the 3 second threshold was reached, the results of the call were released. The logs illustrated on FIG. 13 show the scheduler operating with a request every minute writing the total amount of transactions to the logs. The timestamps on these records were unaffected by chaos on the manual endpoint, as the only annotations in the scheduled chain of calls are the ones causing disruption for a different set of tags that does not match the one that was activated. FIG. 15 illustrates example disruptions on the data access object underlying the scheduled call.

Figure 16:
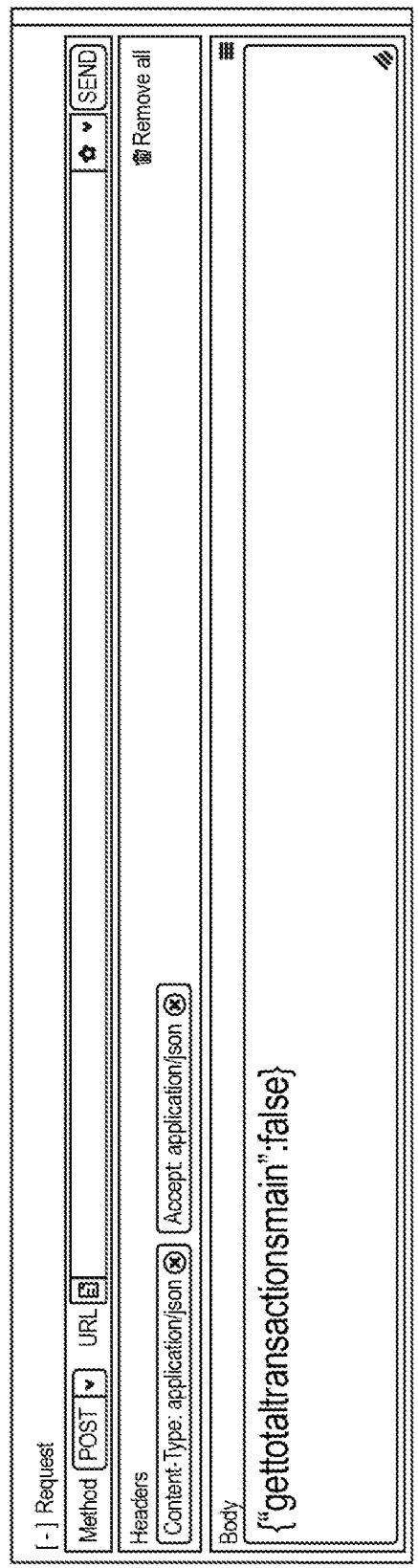
Figure 17:
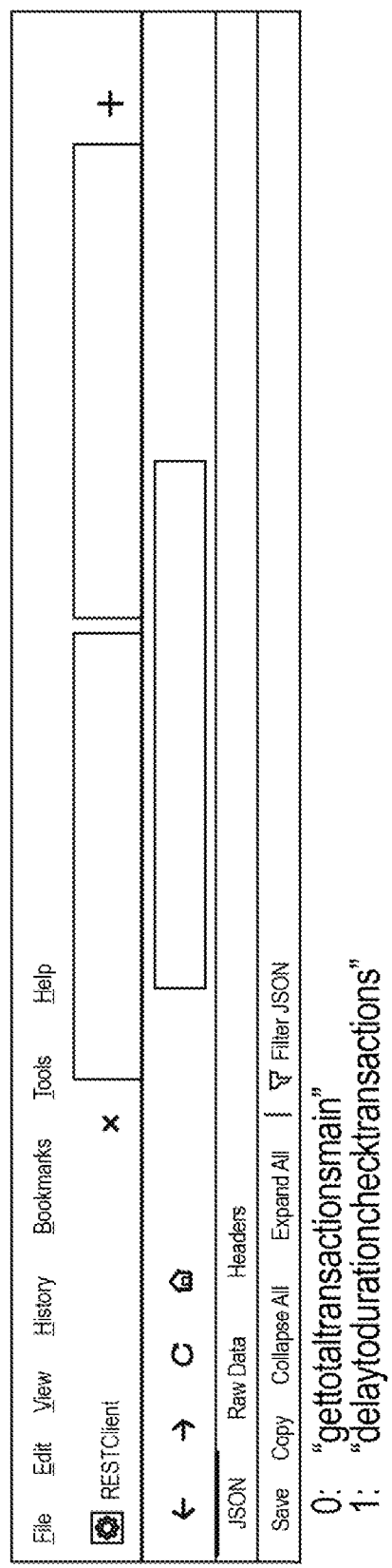
Figure 18:
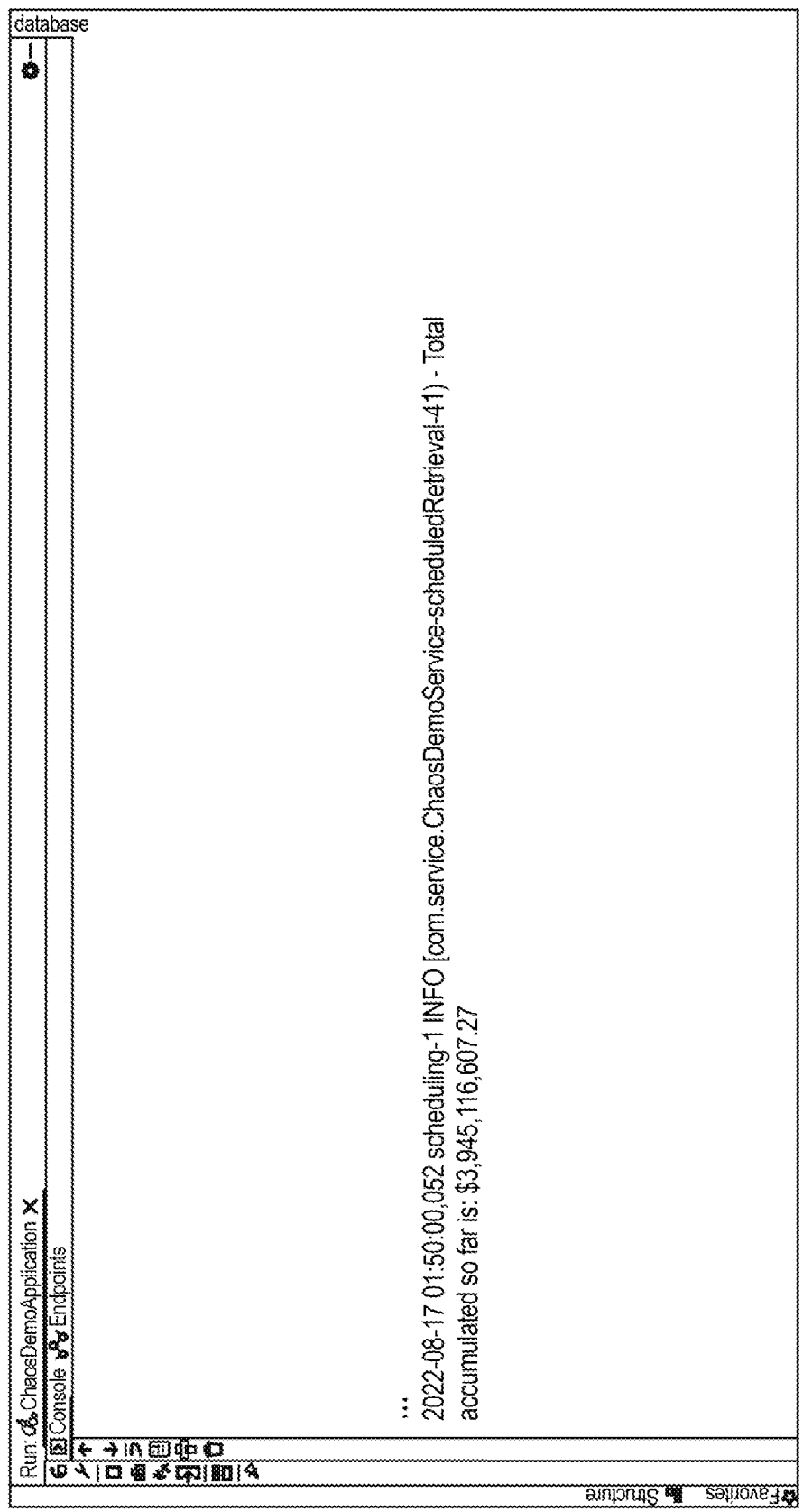

As can be seen from FIG. 7, the scheduled call has an alternative pipeline execution built in. The scheduled call will attempt to retrieve data from the main data source, and if there is an issue with retrieval, the scheduled call switches to an alternative data source. Activating the chaos injection on the main data source should still allow the scheduled task to retrieve the data as long as the reserve data source remains active. As such, the chaos injection may be used to validate that the application operates as it is designed to and seek the alternative data source. FIG. 16 illustrates the addition of the tag for activation of chaos injection (e.g., "gettotaltransactionsmain") on the main data source of the data access object for the scheduled task to the list of activated tags via a POST request. FIG. 17 illustrates that the tags endpoint indicates there are two active tags. FIG. 18 illustrates that despite the chaos injection into the main data source that triggered the exception, the total amount has still been retrieved using the alternative pathway.

Figure 19:
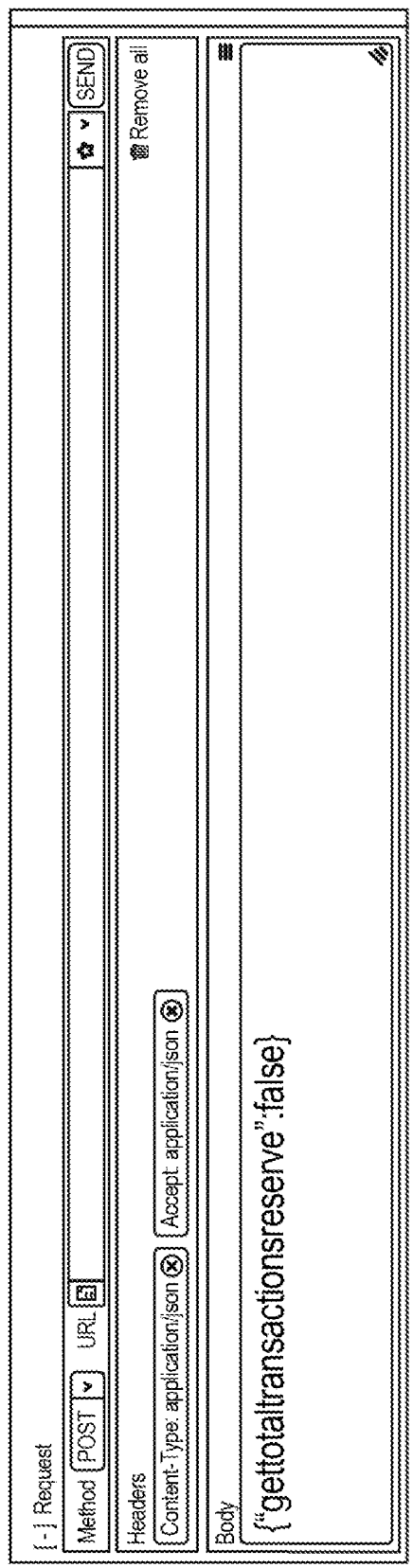
Figure 20:
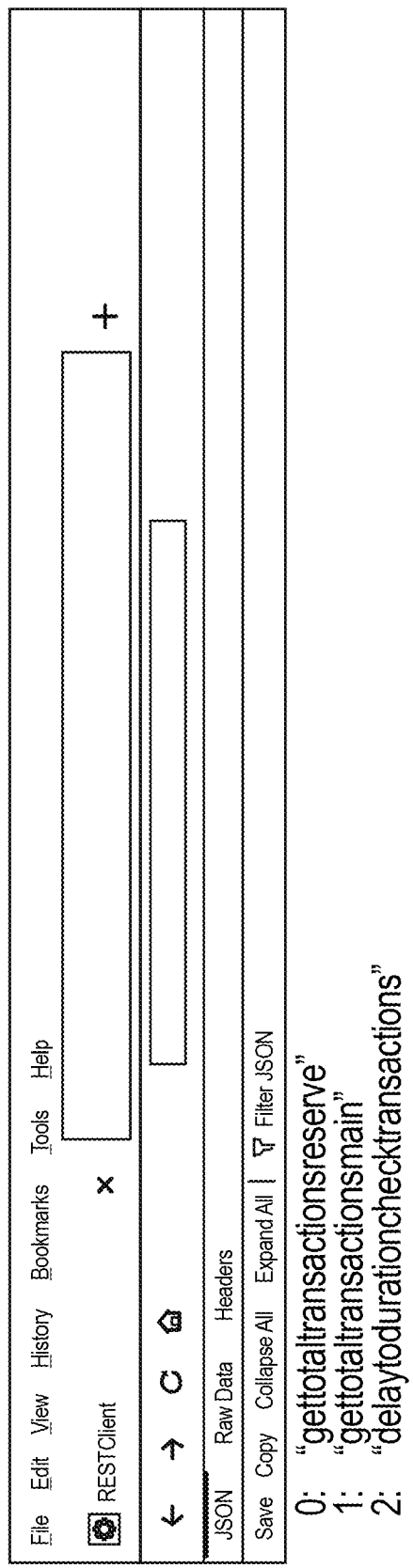

The developer may then want to determine whether the application responds as intended if the reserve data source of the data access object for the scheduled task is not available. FIG. 19 illustrates the developer making an addition of the tag for activation of chaos injection (e.g., "gettotaltransactionsreserve") on the reserve data source of the data access object for the scheduled task to the list of activated tags via a POST request. FIG. 20 illustrates that the tags endpoint indicates there are three active tags such that both the main pathway and the reserve pathway have chaos injection now activated. FIG. 21 illustrates the failure of both pathways causes the error propagation all the way to the scheduler within the Spring framework. A generic failure might be good enough for debugging, but for a production usage, the exception handling for the case of all pathways failing should be enhanced to produce a more explicit and easier to identify log message. As such, the developer may now go back and update the source code of the application to provide the easier to identify log message when all pathways fail.

Figure 22:
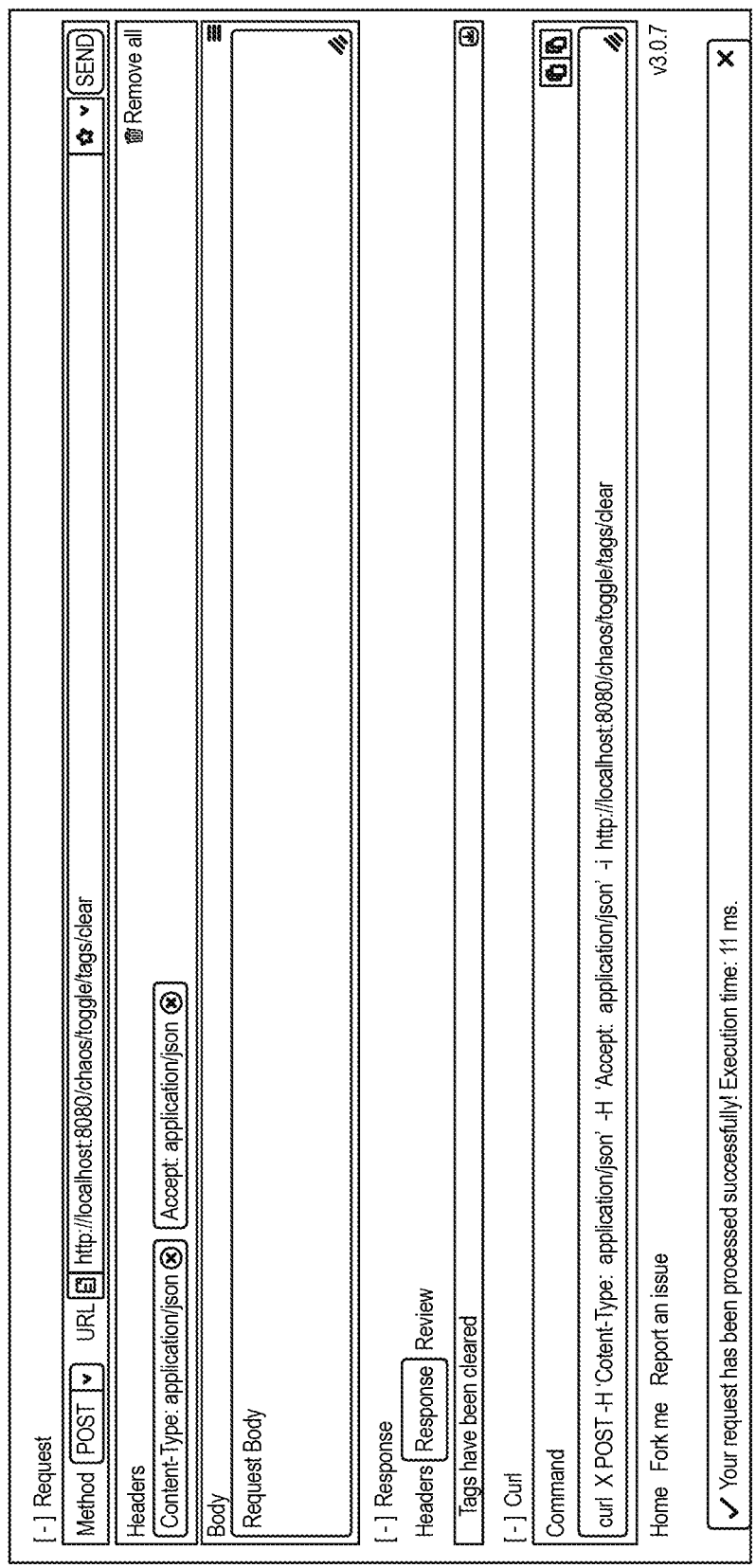
Figure 23:
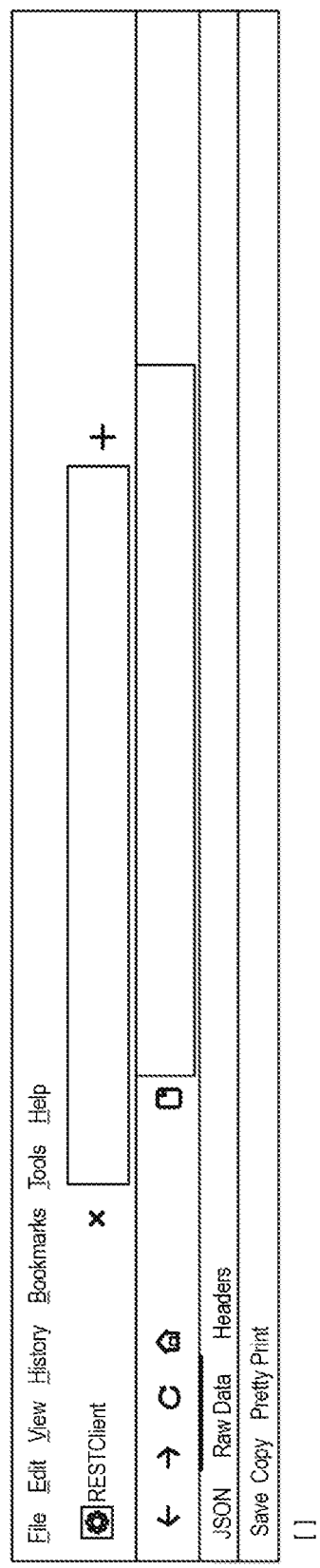
Figure 24:
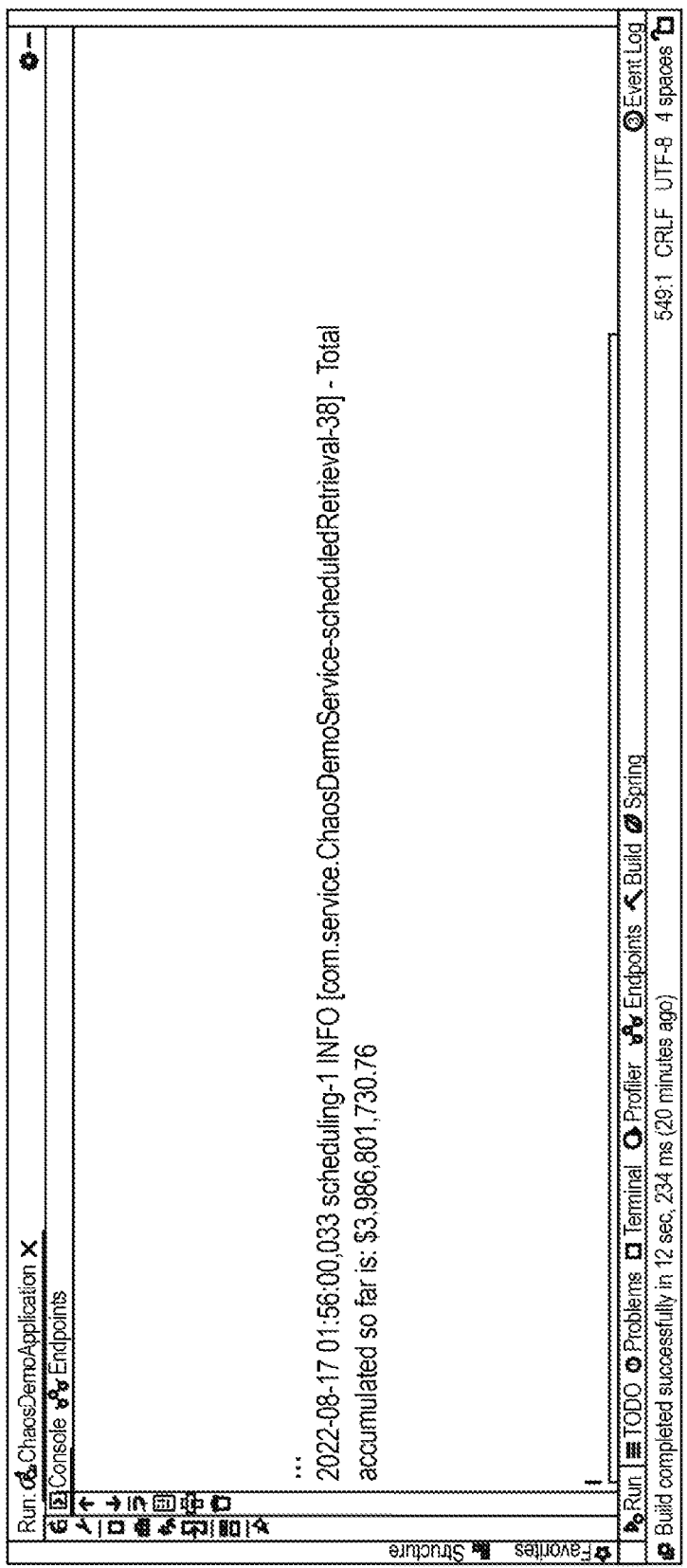

FIG. 22 illustrates a demonstration of clearing the tags with a POST request, and FIG. 23 illustrates that the tags endpoint indicates there are no active tags. As such, the application returns to a pre-chaos/normal operation with no error state persisting, as illustrated on FIG. 24, where the next scheduler cycle completes successfully.

Figure 25:
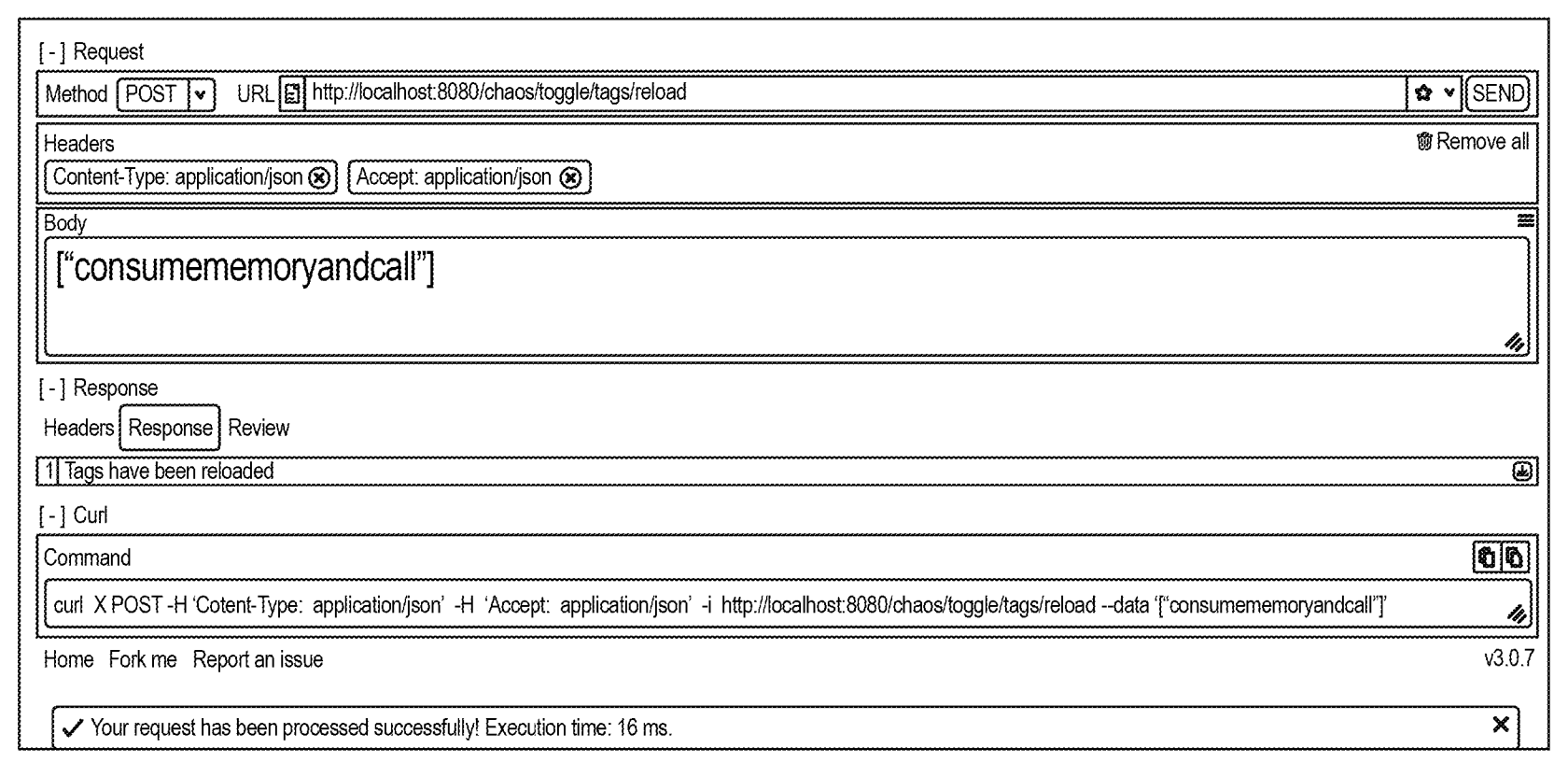
Figure 26:
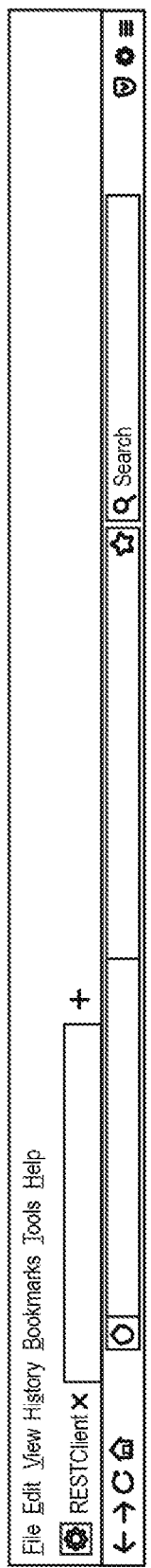
Figure 27:
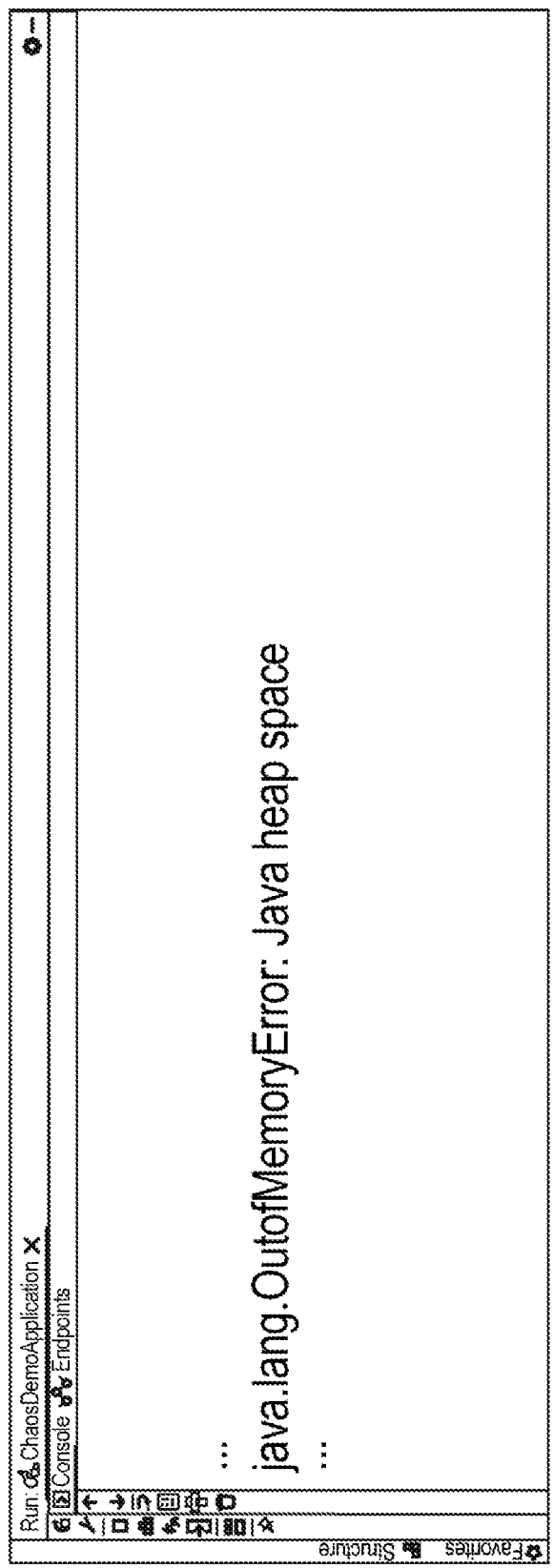

In another example of chaos injection and as illustrated in FIG. 7, the service call underlying the manual call to the controller has a "@ConsumeMemoryAndCall" chaos with parameter amount 0 indicating that it will consume all available memory up until the amount of remaining available memory is less than a single block size (the default being a 1 MB block). FIG. 25 illustrates the developer making an addition of the tag for activation of chaos injection (e.g., "consumememoryandcall") via a POST request. FIG. 26 illustrates an error message that is generated by the application and provided to a user when the application is executed. FIG. 27 illustrates that an out of memory error has been logged. While accepting the error and ensuring that it is handled gracefully is an option, there may be possible ways to avoid the error that involve switching to asynchronous streaming interfaces that would reduce the memory footprint to a single chunk of data or removing the node out of operation so that other nodes with more memory take the work. The exact scenario of what is considered a pass for out of memory error is dependent on the specific application.

Furthermore, injecting chaos may have more than one annotation active on the same method for simulation of more complex disaster scenarios. For example, as illustrate in FIG. 28, the main data retrieval for a manual call has both an "@DelayMethod" and an "@DisableMethod" annotation, which will both be activated by "gettransactionsmain" tag. This combination of tags triggers simulation of a situation, where the data source still accepts the connections, but is unable to service them. Even though there is a healthy reserve source, the request handling being sequential and synchronous means that the response will be delayed (potentially indefinitely) until the corrupt data source releases the connection (potentially jeopardizing both the system stability and the SLA). Here the delay value is just 100 ms as an overriding duration is not provided. Thus, the defaults are utilized. FIG. 29 shows that request took 244 ms to complete instead of the regular <200 ms, as illustrated in FIG. 30.

Thus, the systems and methods of the present disclosure provide application scenario injection and validation. By injecting scenarios such as chaos into an application at the source code level, the systems and methods of the present disclosure co-locate the chaos testing components with regular functional code, producing disruptions that are context aware. Applying this approach achieves the highest value from chaos injection testing by allowing to precisely synchronize each stage of a component executing a specific operation with the ongoing disruption. This gives a full picture of the component preparedness to handle such a situation in a real environment.

Figure 31:
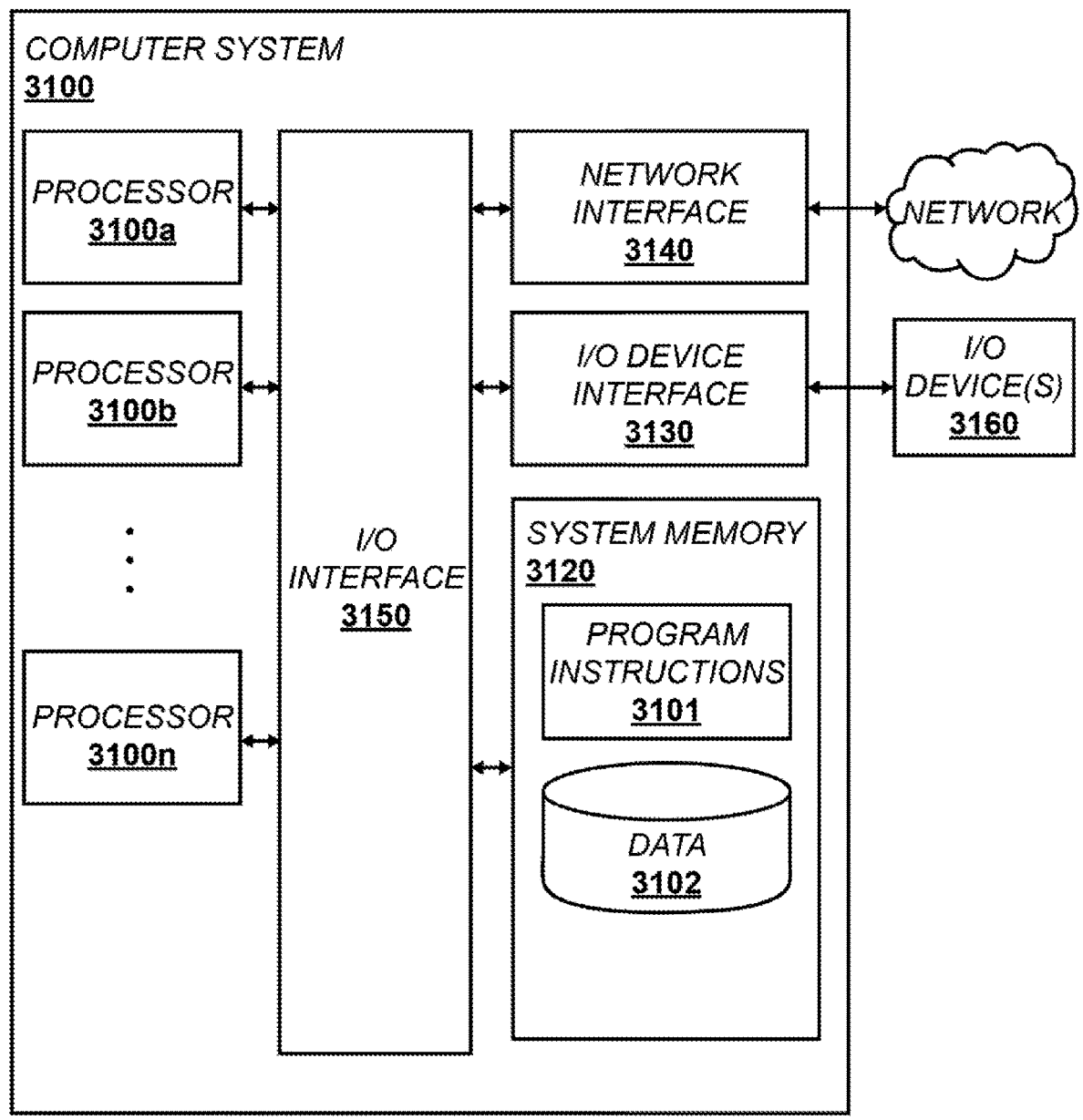
FIG. 31 is a block diagram of an example of a computing system with which the present techniques may be implemented, in accordance with some embodiments of the present disclosure.

FIG. 31 is a diagram that illustrates an exemplary computing system 3100 in accordance with embodiments of the present technique. The user computing device 102 and the time series simulation computing devices 104 and 200, and the data object provider computing device 106 discussed above, may be provided by the computing system 3100. Various portions of systems and methods described herein, may include or be executed on one or more computing systems similar to computing system 3100. Further, processes and modules described herein may be executed by one or more processing systems similar to that of computing system 3100. Thus, the systems and methods of the present disclosure provide a robust solution to stress test the investment portfolios or other time series data sets, based on the proportion of each asset class assigned to the portfolio. This will allow the investment managers to better gauge the performance of the suggested portfolio prior to presenting to the prospect or client.

Computing system 3100 may include one or more processors (e.g., processors 3110a-3110n) coupled to system memory 3120, an input/output I/O device interface 3130, and a network interface 3140 via an input/output (I/O) interface 3150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 3100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 3120). Computing system 3100 may be a uni-processor system including one processor (e.g., processor 3110a), or a multi-processor system including any number of suitable processors (e.g., 3110a-3110n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array), an artificial intelligence accelerator, or an ASIC (application specific integrated circuit). As such, the processors or computing systems described herein may include any of the special purpose logic circuitry Computing system 3100 may include a plurality of computing devices (e.g., distributed computing systems) to implement various processing functions.

I/O device interface 3130 may provide an interface for connection of one or more I/O devices 3160 to computing system 3100. I/O devices may include devices that receive input (e.g., from a user) or output information (e.g., to a user). I/O devices 3160 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 3160 may be connected to computing system 3100 through a wired or wireless connection. I/O devices 3160 may be connected to computing system 3100 from a remote location. I/O devices 3160 located on remote computing system, for example, may be connected to computing system 3100 via a network and network interface 3140.

Network interface 3140 may include a network adapter that provides for connection of computing system 3100 to a network. Network interface 3140 may facilitate data exchange between computing system 3100 and other devices connected to the network (e.g., the network 108). Network interface 3140 may support wired or wireless communication. The network may include an electronic communication network, such as the Internet, a local area network (LAN), a wide area network (WAN), a cellular communications network, or the like.

System memory 3120 may be configured to store program instructions 3101 or data 3102. Program instructions 3101 may be executable by a processor (e.g., one or more of processors 3110a-3110n) to implement one or more embodiments of the present techniques. Instructions 3101 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 3120 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 3120 may include a non-transitory computer readable storage medium that may have program instructions stored thereon that are executable by a computer processor (e.g., one or more of processors 3110a-3110n) to cause the subject matter and the functional operations described herein. A memory (e.g., system memory 3120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 3150 may be configured to coordinate I/O traffic between processors 3110a-1010n, system memory 3120, network interface 3140, I/O devices 3160, and/or other peripheral devices. I/O interface 3150 may perform protocol, timing, or other data transformations to convert data signals from one component (e.g., system memory 3120) into a format suitable for use by another component (e.g., processors 3110a-3110n). I/O interface 3150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 3100 or multiple computing systems 3100 configured to host different portions or instances of embodiments. Multiple computing systems 3100 may provide for parallel or sequential processing/execution of one or more portions of the techniques described herein.

Those skilled in the art will appreciate that computing system 3100 is merely illustrative and is not intended to limit the scope of the techniques described herein. Computing system 3100 may include any combination of devices or software that may perform or otherwise provide for the performance of the techniques described herein. For example, computing system 3100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 3100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 3100 may be transmitted to computing system 3100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method, comprising: identifying, by a computer system, one or more injection points in a flow of an application; determining, by the computer system, that a first injection point of the one or more injection points permits scenario injection; injecting, by the computer system, first scenario source code for a first scenario function at the first injection point in source code of the application; and storing, by the computer system, the application including the first scenario source code for the first scenario function.
2. The method of embodiment 1, wherein the first scenario source code is selectively activatable.
3. The method of embodiment 2, further comprising: running, by the computer system, the application when the first scenario source code is deactivated, wherein the running the application when the first scenario source code is deactivated causes the application to operate in a normal mode where the first scenario source code is ignored.
4. The method of any one of embodiments 2 or 3, further comprising: running, by the computer system, the application when the first scenario source code is activated, wherein the running the application when the first scenario source code is activated causes the application to operate concurrently with the first scenario function.
5. The method of embodiment, wherein the running of the first scenario source code at the first injection point causes at least one of a breakdown scenario, a delay scenario, a resource consumption scenario, or an expansion scenario.
6. The method of any one of embodiments 1-5, wherein the first scenario source code includes one or more parameters.
7. The method of embodiment 6, wherein the one or more parameters includes a tag parameter that includes one or more tags that activate the first scenario source code when a tag list includes the one or more tags upon execution of the application.
8. The method of any one of embodiments 1-7, further comprising: determining, by the computer system, that a second injection point of the one or more injection points permits scenario injection; and injecting, by the computer system, second scenario source code for a second scenario function at the second injection point in the source code of the application, wherein the storing the application includes storing the source code of the application that includes the second scenario source code for the second scenario function.
9. The method of any one of embodiments 1-8, further comprising: injecting, by the computer system, second scenario source code for a second scenario function at the first injection point in the source code of the application, wherein the storing the application includes storing the source code of the application that includes the second scenario source code for the second scenario function.
10. The method of embodiment 9, wherein the first scenario source code and the second scenario source code are independently activatable.
11. A method, comprising: receiving, by a computer system, instruction to activate a first scenario function at a first insertion point in source code of an application, wherein the first scenario function includes first scenario source code in the source code of the application; activating, by the computer system, the first scenario function; running, by the computer system, the application when the first scenario function is activated, wherein the running the application when the first scenario function is activated causes the application to operate concurrently with the first scenario function; and providing, by the computer system, a first application output.

12. The method of embodiment 11, further comprising: determining, by the computer system, whether the application performed as expected when the first scenario function operated; and providing, by the computer system, a validation notification indicating whether the application performed as expected during operation of the first scenario function.

13. The method of any one of embodiments 11 or 12, wherein the first application output is different than a second application output when the first scenario function is deactivated.

14. The method of any one of embodiments 11-13, wherein the first application output is the same as a second application output when the first scenario function is deactivated but application performance is different.

15. The method of any one of embodiments 11-14, wherein the first scenario source code includes a tag parameter that includes a first tag.

16. The method of embodiment 15, wherein the receiving the instruction to activate the first scenario function at the first insertion point in the source code of the application, and the activating the first scenario function includes: determining that the first tag is present in an active tag list, and in response, activating the first scenario function.

17. The method of any one of embodiments 11-16, further comprising: receiving second instruction to activate a second scenario function at a second insertion point in the source code of the application; activating the second scenario function; running the application when the second scenario function is activated, wherein the running the application when the second scenario function is activated causes the application to operate concurrently with the first scenario function and the second scenario function; and providing, by the computer system, a second application output.

18. The method of embodiment 17, wherein the activation of the first scenario function causes the activation of the second scenario function.

19. The method of any one of embodiments 11-18, wherein the running of the first scenario source code at the first insertion point causes at least one of a breakdown scenario, a delay scenario, a resource consumption scenario, or an expansion scenario.

20. A non-transitory, machine-readable medium storing instructions that, when executed by one or more processors, effectuate operations comprising: identifying, by a computer system, one or more injection points in a flow of an application; determining, by the computer system, that a first injection point of the one or more injection points permits scenario injection; injecting, by the computer system, first scenario source code for a first scenario function at the first injection point in source code of the application; and storing, by the computer system, the application including the first scenario source code for the first scenario function.

21. A system, comprising: one or more processors; and memory storing instructions that when executed by the processors cause the processors to effectuate operations comprising: identifying, by a computer system, one or more injection points in a flow of an application; determining, by the computer system, that a first injection point of the one or more injection points permits scenario injection; injecting, by the computer system, first scenario source code for a first scenario function at the first injection point in source code of the application; and storing, by the computer system, the application including the first scenario source code for the first scenario function.

What is claimed is:

1. A method, comprising:
receiving, by a computer system, instruction to activate a first scenario function at a first insertion point in source code of an application, wherein the first scenario function includes first scenario source code in the source code of the application, and wherein the first scenario source code includes a tag parameter that includes a first tag used to activate or deactivate the first scenario function;
activating, by the computer system, the first scenario function when the first tag indicates an active status;
running, by the computer system, the application when the first scenario function is activated, wherein the running the application when the first scenario function is activated causes the application to operate concurrently with the first scenario function, wherein the first scenario function includes a first chaos function that causes a change in an operation of at least one of one or more hardware components of the computer system on which the application utilizes or a command flow of the application;
receiving, by the computer system, second instruction to activate a second scenario function at a second insertion point in the source code of the application;
activating, by the computer system, the second scenario function;
running, by the computer system, the application when the second scenario function is activated, wherein the running the application when the second scenario function is activated causes the application to operate concurrently with the first scenario function and the second scenario function; and
providing, by the computer system, a first application output.

2. The method of claim 1, further comprising:
determining, by the computer system, whether the application performed as expected when the first scenario function and the second scenario function operated; and
providing, by the computer system, a validation notification indicating whether the application performed as expected during operation of the first scenario function and the second scenario function.

3. The method of claim 1, wherein the first application output is different than a second application output when at least one of the first scenario function or the second scenario function is deactivated.

4. The method of claim 1, wherein the first application output is the same as a second application output when at least one of the first scenario function or the second scenario function is deactivated but application performance is different.

5. The method of claim 1, wherein the receiving the instruction to activate the first scenario function at the first insertion point in the source code of the application, and the activating the first scenario function includes:

determining that the first tag is present in an active tag list, and in response, activating the first scenario function.

6. The method of claim 1, wherein the activation of the first scenario function causes the activation of the second scenario function.

7. The method of claim 1, wherein the running of the first scenario source code at the first insertion point causes at least one of a breakdown scenario, a delay scenario, a resource consumption scenario, or an expansion scenario.

8. A system, comprising:
one or more processors; and
memory storing instructions that when executed by the one or more processors cause the one or more processors to effectuate operations comprising:
receiving instruction to activate a first scenario function at a first insertion point in source code of an application, wherein the first scenario function includes first scenario source code in the source code of the application, and wherein the first scenario source code includes a tag parameter that includes a first tag used to activate or deactivate the first scenario function;
activating the first scenario function when the first tag indicates an active status;
running the application when the first scenario function is activated, wherein the running the application when the first scenario function is activated causes the application to operate concurrently with the first scenario function, wherein the first scenario function includes a first chaos function that causes a change in an operation of at least one of the one or more processors, the memory, other hardware components coupled to the one or more processors which the application utilizes, or a command flow of the application;
receiving second instruction to activate a second scenario function at a second insertion point in the source code of the application;
activating the second scenario function;
running the application when the second scenario function is activated, wherein the running the application when the second scenario function is activated causes the application to operate concurrently with the first scenario function and the second scenario function; and
providing a first application output.

9. The system of claim 8, wherein the operations further comprise:
determining whether the application performed as expected when the first scenario function and the second scenario function operated; and
providing a validation notification indicating whether the application performed as expected during operation of the first scenario function and the second scenario function.

10. The system of claim 8, wherein the first application output is different than a second application output when at least one of the first scenario function or the second scenario function is deactivated.

11. The system of claim 8, wherein the first application output is the same as a second application output when at least one of the first scenario function or the second scenario function is deactivated but application performance is different.

12. The system of claim 8, wherein the receiving the instruction to activate the first scenario function at the first insertion point in the source code of the application, and the activating the first scenario function includes:
determining that the first tag is present in an active tag list, and in response, activating the first scenario function.

13. The system of claim 8, wherein the activation of the first scenario function causes the activation of the second scenario function.

14. The system of claim 8, wherein the running of the first scenario source code at the first insertion point causes at least one of a breakdown scenario, a delay scenario, a resource consumption scenario, or an expansion scenario.

15. A non-transitory, machine-readable medium storing instructions that, when executed by one or more processors, effectuate operations comprising:
receiving instruction to activate a first scenario function at a first insertion point in source code of an application, wherein the first scenario function includes first scenario source code in the source code of the application, and wherein the first scenario source code includes a tag parameter that includes a first tag used to activate or deactivate the first scenario function;
activating the first scenario function when the first tag indicates an active status;
running the application when the first scenario function is activated, wherein the running the application when the first scenario function is activated causes the application to operate concurrently with the first scenario function, wherein the first scenario function includes a first chaos function that causes a change in an operation of at least one of the one or more processors, other hardware components coupled to the one or more processors which the application utilizes, or a command flow of the application;
receiving second instruction to activate a second scenario function at a second insertion point in the source code of the application;
activating the second scenario function;
running the application when the second scenario function is activated, wherein the running the application when the second scenario function is activated causes the application to operate concurrently with the first scenario function and the second scenario function; and
providing a first application output.

16. The medium of claim 15, wherein the operations further comprise:
determining whether the application performed as expected when the first scenario function and the second scenario function operated; and
providing a validation notification indicating whether the application performed as expected during operation of the first scenario function and the second scenario function.

17. The medium of claim 15, wherein the first application output is different than a second application output when at least one of the first scenario function or the second scenario function is deactivated.

18. The medium of claim 15, wherein the receiving the instruction to activate the first scenario function at the first insertion point in the source code of the application, and the activating the first scenario function includes:
determining that the first tag is present in an active tag list, and in response, activating the first scenario function.

19. The medium of claim 15, wherein the activation of the first scenario function causes the activation of the second scenario function.

20. The medium of claim 15, wherein the running of the first scenario source code at the first insertion point causes at least one of a breakdown scenario, a delay scenario, a resource consumption scenario, or an expansion scenario.

* * * * *